US012711156B1

(12) United States Patent
Woods et al.

(10) Patent No.: US 12,711,156 B1
(45) Date of Patent: Aug. 18, 2026

(54) METHOD AND SYSTEM FOR DATASET CLASSIFICATION AND RECOMMENDATION

(71) Applicant: AI Leadership Labs, LLC, Austin, TX (US)

(72) Inventors: Geoff Woods, Austin, TX (US); Randall Joseph Ottinger, Bellevue, WA (US)

(73) Assignee: AI Leadership Labs, LLC, Austin, TX (US)

( * ) Notice: Subject to any disclaimer, the term of this patent is extended or adjusted under 35 U.S.C. 154(b) by 0 days.

(21) Appl. No.: 19/305,342

(22) Filed: Aug. 20, 2025

(51) Int. Cl.

| | |
|---|---|
| ***G06F 16/00*** | (2019.01) |
| ***G06F 16/28*** | (2019.01) |
| ***G06F 16/334*** | (2025.01) |
| ***G06F 16/951*** | (2019.01) |

(52) U.S. Cl.
CPC .......... *G06F 16/285* (2019.01); *G06F 16/334* (2019.01); *G06F 16/951* (2019.01)

(58) Field of Classification Search
None
See application file for complete search history.

(56) References Cited

U.S. PATENT DOCUMENTS

| | | | | |
|---|---|---|---|---|
| 2019/0147366 | A1 | 5/2019 | Sankaran et al. | |
| 2023/0281564 | A1* | 9/2023 | Zhang | G06Q 10/063112 705/321 |
| 2025/0182219 | A1* | 6/2025 | Lebwohl | H04L 67/306 |
| 2025/0258819 | A1* | 8/2025 | Jain | G06F 40/279 |

FOREIGN PATENT DOCUMENTS

| | | | |
|---|---|---|---|
| CN | 116821430 | A | 9/2023 |
| CN | 119739929 | A | 4/2025 |
| CN | 119848350 | A | 4/2025 |

* cited by examiner

*Primary Examiner* — Anhtai V Tran
(74) *Attorney, Agent, or Firm* — Caldwell LLC

(57) ABSTRACT

A system for dataset classification and recommendation includes at least a processor and a memory, wherein the memory includes instructions that configure the processor to receive and process multimodal user data; and determine at least one connection recommendation.

18 Claims, 8 Drawing Sheets

METHOD AND SYSTEM FOR DATASET CLASSIFICATION AND RECOMMENDATION

FIELD OF THE INVENTION

The present invention generally relates to the field of search customization. In particular, the present invention is directed to dataset classification and recommendation.

BACKGROUND

Traditional data matching systems fail to process and align and match heterogeneous data sources. These systems are typically limited to matching based on static, uniform inputs and lack the ability to integrate dynamic, multimodal data. This presents a technical challenge in transforming diverse user inputs into a common structured format suitable for classification and scoring.

SUMMARY OF THE DISCLOSURE

In an aspect, a system for dataset classification and recommendation includes at least a processor and a memory, wherein the memory includes instructions that configure the processor to receive and process multimodal user data; receiving and processing multimodal user data includes receiving a first user dataset from a first user, including a first plurality of historical interaction data, wherein the first plurality of historical interaction data includes at least unstructured textual data; structuring the unstructured textual data into structured textual data using natural language processing; retrieving a set of structured data related to the first user; and combining the set of structured data and the structured textual data to form a first structured user data set; determining at least one connection recommendation, wherein determining the connection recommendation includes classifying, by an implementation criteria machine-learning model, the structured user data set to a first plurality of implementation scores; and determining the connection recommendation for the user by applying a rules engine to the first plurality of implementation scores, wherein the rules engine is configured to generate an ordered list including the at least one connection recommendation based on at least comparing the first plurality of implementation scores for the first user to a second plurality of implementation scores for a second user, and calculating an implementation delta across the first plurality of implementation scores for the first user and the second plurality of implementation scores for the second user.

In another aspect, a method for dataset classification and recommendation includes receiving and processing multimodal user data, wherein receiving and processing multimodal user data includes receiving a first user dataset from a first user including a first plurality of historical interaction data, wherein the first plurality of historical interaction data includes at least unstructured textual data; structuring the unstructured textual data into structured textual data using natural language processing; retrieving a set of structured data related to the first user; and combining the set of structured data and the structured textual data to form a first structured user data set; determining at least one connection recommendation, wherein determining the connection recommendation includes classifying, by an implementation criteria machine-learning model, the structured user data set to a first plurality of implementation scores; and determining the connection recommendation for the user by applying a rules engine to the first plurality of implementation scores, wherein the rules engine is configured to generate an ordered list including the at least one connection recommendation based on at least comparing the first plurality of implementation scores for the first user to a second plurality of implementation scores for a second user, and calculating an implementation delta across the first plurality of implementation scores for the first user and the second plurality of implementation scores for the second user.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
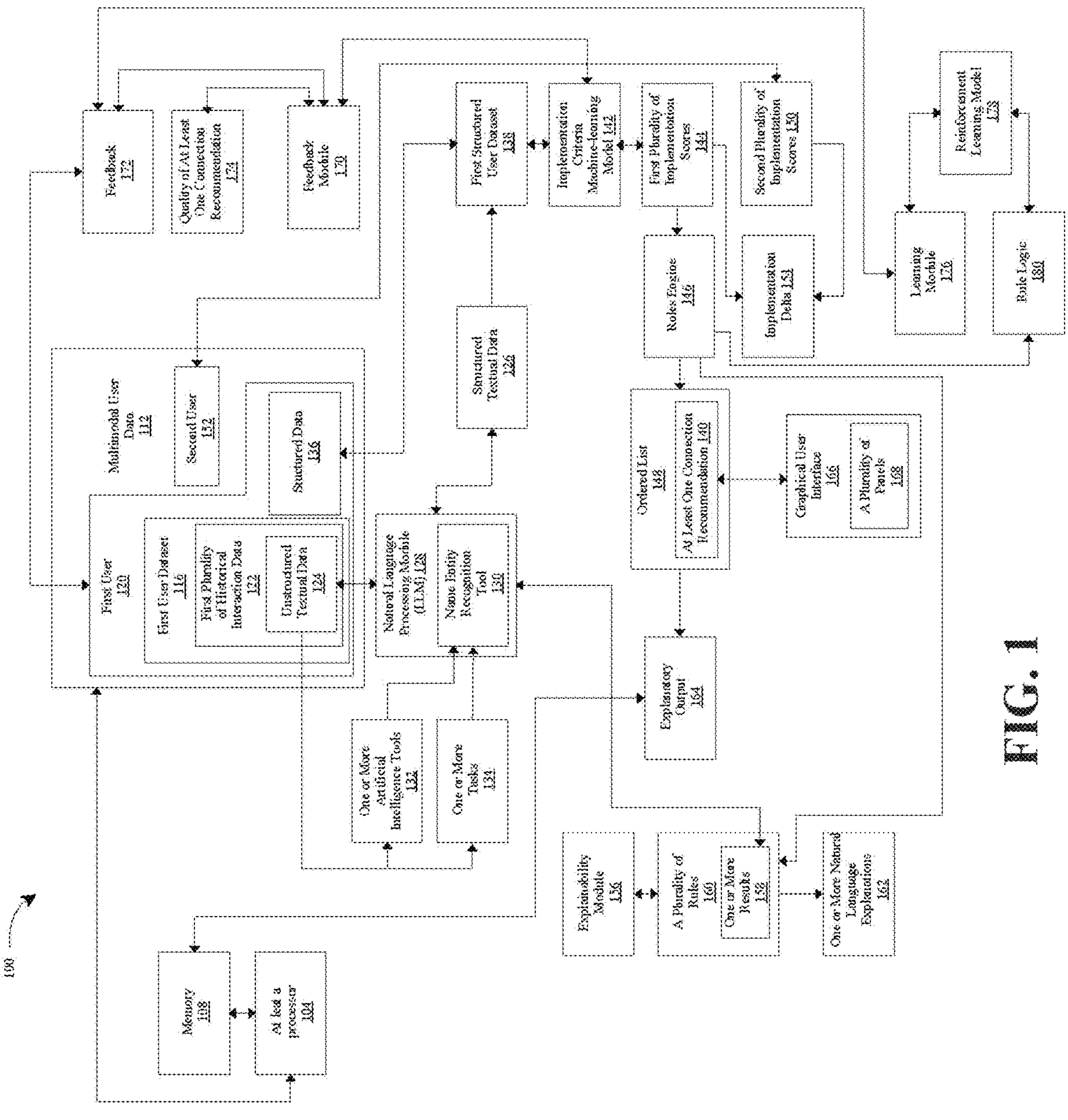
FIG. 1 is a diagram illustrating a system for dataset classification and recommendation.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for dataset classification and recommendation Aspects of the present disclosure can be used for a system for dataset classification and recommendation includes at least a processor and a memory, wherein the memory includes instructions that configure the processor to receive and process multimodal user data; receiving and processing multimodal user data includes receiving a first user dataset from a first user, including a first plurality of historical interaction data, wherein the first plurality of historical interaction data includes at least unstructured textual data; structuring the unstructured textual data into structured textual data using natural language processing; retrieving a set of structured data related to the first user; and combining the set of structured data and the structured textual data to form a first structured user data set; determining at least one connection recommendation, wherein determining the connection recommendation includes classifying, by an implementation criteria machine-learning model, the structured user data set to a first plurality of implementation scores; and determining the connection recommendation for the user by applying a rules engine to the first plurality of implementation scores, wherein the rules engine is configured to generate an ordered list including the at least one connection recommendation based on at least comparing the first plurality of implementation scores for the first user to a second plurality of implementation scores for a second user, and calculating an implementation delta across the first plurality of implementation scores for the first user and the second plurality of implementation scores for the second user.

Aspects of the present disclosure can also be used for a method for dataset classification and recommendation includes receiving and processing multimodal user data, wherein receiving and processing multimodal user data includes receiving a first user dataset from a first user including a first plurality of historical interaction data, wherein the first plurality of historical interaction data includes at least unstructured textual data; structuring the unstructured textual data into structured textual data using natural language processing; retrieving a set of structured data related to the first user; and combining the set of structured data and the structured textual data to form a first structured user data set; determining at least one connection recommendation, wherein determining the connection recommendation includes classifying, by an implementation criteria machine-learning model, the structured user data set to a first plurality of implementation scores; and determining the connection recommendation for the user by applying a rules engine to the first plurality of implementation scores, wherein the rules engine is configured to generate an ordered list including the at least one connection recommendation based on at least comparing the first plurality of implementation scores for the first user to a second plurality of implementation scores for a second user, and calculating an implementation delta across the first plurality of implementation scores for the first user and the second plurality of implementation scores for the second user.

Referring now to FIG. 1, an exemplary embodiment of system 100 for content classification and recommendation is illustrated. System 100 may include circuitry such as without limitation a processor 104 communicatively connected to a memory 108; for instance, circuitry may include and/or be included in at least a processor 104. As used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of at least a processor 104. Communicative connecting may also include indirect connections via, for example without limitation, wireless connection, radio communication, low power wide area network, optical communication, magnetic, capacitive, or optical coupling, and the like. In some instances, the terminology "communicatively coupled" may be used in place of communicatively connected in this disclosure.

Circuitry may alternatively or additionally be implemented by configuring a hardware device such as a combinatorial or sequential logic circuit, an application-specific integrated circuit (ASIC), a field-programmable gate array (FPGA), or other hardware unit; memory may be attached thereto to further configure the hardware unit using read-only memory (ROM) or any other static or writable memory as described in this disclosure. Alternatively or additionally, hardware units and/or modules may be combined with and/or in communication with a processor, such as without limitation in a system-on-chip architecture wherein some functions are configured by modification or design of hardware circuitry, such as without limitation FPGA circuitry, while others are configured in the form of instructions in memory for one or more processors. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

With continued reference to FIG. 1, at least a processor 104 may be designed and/or configured to perform any method, method step, or sequence of method steps in any embodiment described in this disclosure, in any order and with any degree of repetition. For instance, at least a processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. At least a processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, at least a processor 104 is configured to receive and process multimodal user data 112, wherein receiving and processing multimodal user data 112 includes receiving a first user dataset 116 from a first user 120, including a first plurality of historical interaction data 122, wherein the first plurality of historical interaction data 122 includes unstructured textual data 124. "Multimodal user data," as used in this disclosure, is user related information that includes multiple types of data modalities, such as structured data and unstructured data. In one or more embodiments, structured data may include information organized in a predefined format, typically stored in relational databases or other structured repositories. In one or more embodiments, structured data may adhere to a specific schema, with rows and columns representing records and attributes, allowing for efficient storage, retrieval, and analysis. In one or more embodiments, structured data may include standardized inputs such as user profile fields, organization attributes, AI capability assessments, benchmarking results, and numerical responses. In one or more embodiments, unstructured data may include open-ended responses, free-form survey answers, uploaded documents, communication logs, or qualitative feedback received from a user. In one or more embodiments, multimodal user data 112 may originate from internal sources. For example, and without limitation, internal sources may include direct member inputs, company assessments, or historical interactions. In one or more embodiments, multimodal user data 112 may originate from external sources. For example, and without limitation, external sources may include public databases, market research, or competitor analysis.

With continued reference to FIG. 1, "user dataset," as used in this disclosure, is a collection of data items associated with a user entity. In one or more embodiments, a user dataset may include both real-time and historical information reflecting a user's activities, stated preferences, and engagement patterns within the system. In one or more embodiments, user dataset may be derived from multiple sources, including user-submitted forms, AI capability assessments, feedback modules, public data retrieved using web crawlers, and interaction logs recorded during use of system. In one or more embodiments, a user dataset may include structured data. For example, and without limitation, structured data may include profile metadata that contains name, organization, role/title, industry sector, region; organizational characteristic data that contains company size, type (e.g., startup, academic, enterprise), and digital maturity stage; assessment scores data that contains responses to AI maturity model assessments, including quantitative scores across implementation readiness, capability depth, governance, and use case impact; implementation scores that contains model-generated ratings reflecting how far along the user or their organization is on specific AI initiatives; resource utilization logs that contains tracking how often users access or download recommended resources, documents, or tools. In one or more embodiments, user dataset may include unstructured data collected from open-ended responses, uploaded internal documents, feedback narratives, or platform usage notes. For example, and without limitation, unstructured data may include Interaction history data that contains prior matches accepted or ignored, resources viewed or bookmarked, frequency of logging into the system; engagement depth data that contains information on whether users simply read recommendations or actively interact (e.g., initiate contact with a matched expert, follow up with a recommended resource); temporal behavior data that contains cadence of user engagement, including whether behavior changes following new recommendation cycles or assessment completion; feedback behavior data that contains ratings or qualitative feedback submitted about past recommendations, including clarity, relevance, or outcome realization. "AI maturity," as used in this disclosure, is a multidimensional measure of an individual's or organization's progress, readiness, and capability in adopting, implementing, and scaling artificial intelligence technologies and practices. In one or more embodiments, AI maturity may include technical, organizational, and strategic dimensions such as infrastructure readiness, talent capacity, governance structures, use case deployment, and integration of AI into core workflows. In one or more embodiments, AI maturity may be quantified using benchmarking framework configured to evaluate structured and unstructured user data, including assessment responses, engagement behavior, tool usage, and feedback patterns. In one or more embodiments, AI maturity levels may be expressed as numerical scores or categorical labels (e.g., beginner, developing, advanced, optimized), and may serve as primary inputs for connection recommendation logic, opportunity mapping, and progression tracking. "User," as used in this disclosure, is any system participant whose information may be collected, analyzed, and used for generating connection recommendations. In one or more embodiments, a first user 120 may be a primary system participant who initiates engagement by uploading organization-specific content, completing AI capability assessments, or browsing available opportunities and resources. In one or more embodiments, user-related information may also be augmented by external public data sources. For example, and without limitation, a web crawler may be configured to identify and extract publicly available information about a first user 120 or their affiliated organization, such as press releases, research publications, professional directory entries, or social media activity. In one or more embodiments, extracted information may be transformed into structured data using one or more natural language processing pipelines and stored in a database schema that supports integration with existing internal datasets. In one or more embodiments, structured data derived from external sources may include organization-level attributes such as company size, sector, geographic location, and declared AI focus areas, or individual-level indicators such as recent speaking engagements, published work, affiliations with innovation consortia, or participation in public AI initiatives.

With continued reference to FIG. 1, "historical interaction data," as used in this disclosure, is data that reflects a user's past activities and behavior within a system. In one or more embodiments, historical interaction data may include interactions with recommended connections, prior engagement with educational or resource content, feedback submitted regarding recommendation quality, and patterns of activity over time. In one or more embodiments, historical interaction data may reflect the user's progress across AI maturity benchmarks, previous matches or suggestions accepted or declined, and metadata indicating engagement depth and timing. "Unstructured textual data," as used in this disclosure, is text-based information that lacks a predefined schema. In one or more embodiments, unstructured textual data 124 may include narrative responses in benchmarking assessments, uploaded reports or internal strategy documents, email content, or user-submitted free text indicating preferences or goals. In one or more embodiments, unstructured textual data 124 may include a written response from a first user 120 describing their current AI implementation challenges, innovation priorities, or areas where expertise is sought.

With continued reference to FIG. 1, at least a processor 104 is configured to structure the unstructured textual data 124 into structured textual data 126 using natural language processing. Structuring the unstructured textual data 124 into structured textual data 126 using natural language processing may include applying a natural language processing module 128, wherein the natural language processing module 128 may include name entity recognition tool 130. A name entity recognition tool 130 may be configured to identify one or more artificial intelligence tools 132 and one or more tasks 134 in unstructured textual data 124. "Structured textual data," as used in this disclosure, is information derived from free-form or unformatted user input that has been processed and organized into a machine-readable and schema-compliant format. In one or more embodiments, structured output may enable consistent classification, indexing, and downstream analysis of user inputs, such as mapping text responses into predefined categories or entities relevant to recommendation logic. In one or more embodiments, A natural language processing module 128 may tokenize input sentences, detect parts of speech, perform dependency parsing, or classify sentence-level intent. "Artificial intelligence tools," as used in this disclosure, are software platforms, libraries, or frameworks used by users or organizations to build, deploy, or manage machine learning and AI applications. In one or more embodiments, identified artificial intelligence tools may include technologies such as TensorFlow, PyTorch, Azure ML, or pre-built AutoML platforms. "Tasks," as used in this disclosure, are application-level objectives or processes that AI systems are designed to perform or support. In one or more embodiments, one or more tasks 134 may include objectives such as image classification, language translation, predictive analytics, fraud detection, customer segmentation, or process automation. In one or more embodiments, named entity recognition tool may identify mentions of tools and tasks within a user's unstructured responses, such as those submitted during AI maturity assessments or progress reporting, and convert them into structured representations that reflect a user's current capabilities and areas of focus. In one or more embodiments, unstructured textual data 124 may additionally include information passively captured from a user's digital behavior, which may be structured into structured textual data 126 using natural language processing module 128. For example, and without limitation, unstructured data may be generated by logging URLs or website domains visited by a user, which may indicate interaction with specific AI tool documentation, tutorials, or cloud-based development platforms. In one or more embodiments, a natural language processing module 128 may be configured to analyze domain names and webpage metadata to extract probable associations with one or more artificial intelligence tools 132 or one or more tasks 134. In one or more embodiments, unstructured textual data 124 may be generated by logging keystrokes from a user device. For example, and without limitation, if a user frequently types CLI commands such as pip install transformers, import torch, or train_model.py, a keystroke monitoring module may capture these strings as indicators of tool usage. In one or more embodiments, natural language processing module 128 may analyze this text stream using tokenization and named entity recognition to convert command-line usage patterns into structured representations of tool engagement. In one or more embodiments, unstructured textual data 124 may also include metadata from application logs or process execution records. For example, and without limitation, a background service installed on a user device may record the launch or active usage of local applications, and these logs may be parsed to identify which one or more artificial intelligence tools 132 are being utilized. In one or more embodiments, a natural language processing module 128 may extract the names, version identifiers, or task categories associated with each logged program and classify them as structured textual data 126. In one or more embodiments, passive data collection may be performed by monitoring user activity using a network address such as an IP address. For example, and without limitation, a system may log outgoing HTTP or DNS requests from a known IP address and analyze request headers, domains, or payload patterns to identify tool usage or AI task engagement across networked environments.

With continued reference to FIG. 1, system 100 may include a large language model (LLM). A "large language model," as used herein, is a deep learning data structure that can recognize, summarize, translate, predict and/or generate text and other content based on knowledge gained from massive datasets. Large language models may be trained on large sets of data. Training sets may be drawn from diverse sets of data such as, as non-limiting examples, novels, blog posts, articles, emails, unstructured data, electronic records, and the like. In some embodiments, training sets may include a variety of subject matters, such as, as nonlimiting examples, medical report documents, electronic records, entity documents, business documents, inventory documentation, emails, user communications, advertising documents, newspaper articles, blog posts, unstructured data and the like. In some embodiments, training sets of an LLM may include information from one or more public or private databases. As a non-limiting example, training sets may include databases associated with an entity. In some embodiments, training sets may include portions of documents associated with the electronic records correlated to examples of outputs. In an embodiment, an LLM may include one or more architectures based on capability requirements of an LLM. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on a needed capability such generative, contextual, or other specific capabilities.

With continued reference to FIG. 1, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction based algorithm configured to receive an article and apply a probability distribution to the words already typed in a sentence to work out the most likely word to come next in augmented articles. For example, if a user input includes a phrase "we are exploring AI for," a LLM may predict that likely continuations include terms such as "automation," "forecasting," or "customer insights," based on patterns learned from prior organizational responses and AI maturity assessments. An LLM may output such predictions by ranking possible next words or phrases according to a learned probability distribution conditioned on the prompt. For the example given above, a LLM may score "automation" as the most likely continuation, followed by "data analytics" or "model deployment," depending on context. An LLM may include an encoder component, and a decoder component configured to interpret user language and generate structured or explanatory outputs that support the system's recommendation and classification processes.

Still referring to FIG. 1, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, attention mechanism may include, without limitation, generalized attention, self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input, to other words. As a non-limiting example, an LLM may learn to associate the word "you," with "how" and "are." It is also possible that an LLM learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the SoftMax of the scaled scores in score matrix may be taken. The output of this SoftMax function may be called the attention weights. Attention weights may be multiplied by your value vector to obtain an output vector. The output vector may then be fed through a final linear layer.

With continued reference to FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing to refer to FIG. 1, transformer architecture may include a decoder. Decoder may be a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the SoftMax of this matrix is taken, the negative infinities will be zeroed out; this leaves zero attention scores for "future tokens."

Still referring to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a SoftMax layer which may serve to produce probability scores between zero and one. The index may be taken of the highest probability score in order to determine a predicted word.

Still referring to FIG. 1, decoder may take this output and add it to the decoder inputs. Decoder may continue decoding until a token is predicted. Decoder may stop decoding once it predicts an end token.

Continuing to refer to FIG. 1, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any at least a processor 104 that is used by a user. As non-limiting examples, user device may include desktops, laptops, smartphones, tablets, and the like. In some embodiments, input may include any set of data associated with a user's responses to an AI maturity assessment, uploaded documentation describing current AI initiatives, free-text feedback on previous connection recommendations, narrative descriptions of implementation goals, or real-time search prompts for relevant resources, partners, or case studies. These inputs may be used by the LLM to extract relevant information, infer intent, or generate explanatory responses that support the system's recommendation, classification, or benchmarking functions.

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

With continued reference to FIG. 1, at least a processor 104 is configured to retrieve a set of structured data 136 related to the first user 120. In an embodiment, retrieving a set of structured data 136 related to the first user 120 may include using a web crawler to collect public data associated with the first user 120. "Structured data," as used in this disclosure, is data organized according to a predefined format that allows for efficient querying, retrieval, and analysis. In one or more embodiments, a set of structured data 136 may include tabular information such as entries in a relational database, spreadsheet-style attributes, or standardized metadata tags. In one or more embodiments, a set of structured data 136 related to a first user 120 may include, without limitation, AI capability assessment scores, benchmarking responses, organizational metadata (e.g., company size, industry classification), historical implementation ratings, and profile-level attributes (e.g., title, role, geography, sector). In one or more embodiments, a set of structured data 136 may be retrieved from either internal repositories or external sources. 'Web crawler,' as used in this disclosure, is an automated software agent that systematically navigates internet or data domains to access, retrieve, and index information. In one or more embodiments, a web crawler may operate by following hyperlinks, parsing HTML content, and extracting relevant data fields based on predetermined patterns or scraping templates. In one or more embodiments, a web crawler may be configured to extract structured data from publicly available websites, professional directories, government databases, and academic publication repositories. For example, without limitation, a web crawler may collect a first user 120 publicly posted organizational affiliation, recent publications, participation in AI-focused initiatives, or mentions in news articles or press releases. 'Public data,' as used in this disclosure, is data that is freely accessible and not subject to access restrictions, licensing terms, or user authentication requirements. In one or more embodiments, public data may include information published on open-access websites, government portals, public research archives, company press releases, or community profiles on platforms such as LinkedIn, GitHub, or institutional directories. In one or more embodiments, public data associated with a user may be used to enhance or supplement internally collected datasets by providing additional signals about organizational maturity, areas of expertise, recent activity, or emerging needs. In one or more embodiments, public data may be transformed into structured records by applying extraction rules, natural language processing, or schema mapping logic to facilitate integration with existing structured user datasets.

With continued reference to FIG. 1, at least a processor 104 is configured to combine the set of structured data and the structured textual data 126 to form a first structured user data set 138 138. In one or more embodiments, a first structured user data set 138 may be a machine-readable and schema-compliant dataset that aggregates both structured data retrieved from external and internal sources and structured textual data 126 derived from unstructured textual input associated with a first user 120. In one or more embodiments, a first structured user data set 138 may include a comprehensive and unified representation of the first user 120's digital profile, implementation maturity, engagement behavior, and identified needs and capabilities. In one or more embodiments, a first structured user data set 138 may include structured data fields including but not limited to: user profile attributes including name, organization, industry classification, role or title, and geographical region; organizational characteristics including company size, digital maturity stage, AI strategic focus areas, and infrastructure readiness; and benchmarking or assessment scores including AI governance scores, capability depth ratings, implementation readiness levels, and use case prioritization. In one or more embodiments, a first structured user data set 138 may also include structured textual data 126 generated from natural language processing of unstructured user input. For example, and without limitation, structured textual data 126 may include: extracted keywords representing AI tools used by the organization (e.g., TensorFlow, PyTorch, Azure ML); detected tasks or objectives such as predictive analytics, document summarization, or fraud detection; identified implementation goals such as "expanding NLP capabilities" or "improving AI model governance"; and entity relationships, such as links between user-stated challenges and specific tools or capabilities. In one or more embodiments, a first structured user data set 138 may be organized as a composite record with nested data structures capturing different dimensions of user maturity and engagement. For example, and without limitation, a first structured user data set 138 may include a maturity profile object containing numerical scores across benchmark dimensions, a capability inventory object listing tools and platforms used, a goal alignment object describing alignment with system-recommended use cases, and a feedback history object capturing past qualitative and quantitative feedback submitted by the first user 120. In one or more embodiments, a first structured user data set 138 may be stored in a structured database and used as a primary input for downstream processes, including but not limited to implementation scoring, opportunity ranking, and connection recommendation generation.

With continued reference to FIG. 1, at least a processor 104 is configured to determine at least one connection recommendation 140, wherein determining at least one connection recommendation 140 includes: classifying, by an implementation criteria machine-learning model 142, the structured user data set to a first plurality of implementation scores 144; determining the at least one connection recommendation 140 for the user as a function of applying a rules engine 146 to the first plurality of implementation scores, wherein the rules engine 146 is configured to generate an ordered list 148, comprising the at least one connection, as a function of at least: comparing the first plurality of implementation scores for the first user 120 to a second plurality of implementation scores 150 for a second user 152; calculating an implementation delta 154 across the first plurality of implementation scores for the first user 120 and the second plurality of implementation scores 150 for a second user 152. "Implementation criteria machine-learning model," as used in this disclosure, is a predictive or classification model trained to evaluate and score dimensions of AI maturity, capability, and readiness based on structured user data. For the purposes of this disclosure, a "connection recommendation," is a suggested user, node, or resource for a user. In some embodiments, connection recommendation may include a suggested resource. For example, suggested resource, may include suggested webpages, tutorials, classes, eLearning modules, books, and the like. In some embodiments, determining connection recommendation 140, wherein connection recommendation 1040 includes a suggested resource may include matching first user 120 to a suggested resource as a function of implementation scores 150 or implementation delta 154. For example, in some embodiments, first user 120 may be matched with a resource corresponding to their weakest implementation score 150. In some embodiments, each resource may be assigned implementation scores 150 according to the skills taught by the resource. For example, if a large implementation delta 154 exists between implementation scores 150 of first user 120 and implementation scores 150 of the resource, that may indicate that a match should be made as first user 120 would learn from resource. In one or more embodiments, implementation criteria machine-learning model may use supervised learning, reinforcement learning, or ensemble methods to classify users into implementation stages such as "early exploration," "pilot deployment," "scaling," or "optimization." In one or more embodiments, features used by implementation criteria machine-learning model may include structured attributes (e.g., company size, sector), assessment scores (e.g., governance, capability depth), and structured textual data 126 (e.g., identified tasks or platform usage). In one or more embodiments, an output of implementation criteria machine-learning model may be a first plurality of implementation scores 144, which may represent a multi-dimensional vector indicating a user's proficiency or maturity across predefined categories. In one or more embodiments, a first plurality of implementation scores 144 may include normalized values for dimensions such as data infrastructure readiness, AI governance maturity, technical skill coverage, alignment with strategic use cases, and previous implementation success. For example, and without limitation, a first user 120 may receive scores of 0.8 for infrastructure readiness, 0.6 for governance maturity, and 0.9 for technical skill coverage, representing a relatively strong technical base but limited formalized governance processes. In one or more embodiments, rules engine 146 may be a rule-based or hybrid logic module configured to map differences in implementation scores between users into a prioritized list of connection recommendations. "Rules engine," as used in this disclosure, is a processing unit that applies predefined matching logic, thresholds, and prioritization criteria to identify high-impact connection candidates based on complementary strengths and needs. In one or more embodiments, the rules engine 146 may operate on score deltas, categorical alignment, shared objectives, or contextual tags derived from structured user data. For example, and without limitation, a rules engine 146 may assign high priority to a match where one user has a high score in AI governance maturity (e.g., 0.95) and the other has a low score (e.g., 0.35), thereby maximizing opportunity for peer knowledge transfer. "Implementation delta 154," as used in this disclosure, is a quantitative measure of the difference between corresponding implementation scores of two users. In one or more embodiments, an implementation delta 154 may be calculated as an absolute or weighted difference across one or more dimensions to identify asymmetry in maturity or capability. For example, and without limitation, an implementation delta 154 of 0.7 in a category of "deployment experience" may indicate that the second user 152 possesses deployment experience not yet achieved by the first user 120, supporting a strong rationale for connection. In one or more embodiments, rules engine 146 may use the implementation delta 154 to score and rank multiple potential connections. For example, a second user 152 with high maturity in task automation and a strong history of successful deployments may be prioritized as a recommended connection for a first user 120 who has high technical readiness but lacks real-world implementation exposure. In one or more embodiments, the ordered list 148 may be presented to the user through a graphical interface, enabling transparency, filtering, and contextual explanations for each recommended connection.

With continued reference to FIG. 1, the rules engine 146 may be further configured to determine an implementation delta 154 as a function of a strength in an area corresponding to a relative weakness in the first plurality of implementation scores for the first user 120; identify a second user 152 as a function of the second plurality of implementation scores 150; and prioritize the ordered list 148 of the at least one connection recommendation 140. A "weakness," as used in this disclosure, is an implementation score that falls below a predefined threshold or lags significantly behind the mean or benchmark score for a given dimension. A "strength" is a score that exceeds such thresholds or is classified as a top-tier percentile within the same dimension. In one or more embodiments, rules engine 146 may compare the first user 120's scores against domain-specific benchmarks or peer distributions to flag such strengths and weaknesses. In one or more embodiments, rules engine 146 may identify a second user 152 as a candidate connection by detecting complementary implementation profiles. For example, and without limitation, if a first user 120 has a low implementation score in the category of "AI governance maturity" (e.g., score of 0.4) and the second user 152 has a high score in the same category (e.g., score of 0.9), the rules engine 146 may classify this as a strength-to-weakness match and assign a high priority value to the connection. In one or more embodiments, multiple such matches across different dimensions may be aggregated, and a weighted scoring system may be applied to prioritize the most strategically aligned connections. In one or more embodiments, prioritization of the ordered list 148 may take into account additional contextual or qualitative attributes, such as sector overlap, geographical proximity, common resource usage, or shared AI tools. For example, and without limitation, if both users operate in the healthcare domain and have referenced the same AI toolset (e.g., PyTorch and Hugging Face Transformers), a connection recommendation may receive an elevated rank due to increased likelihood of knowledge transfer and contextual relevance. In one or more embodiments, ordered list 148 may be refined using rules that penalize weak matches or filter out redundant recommendations. For instance, users with similar weakness profiles (e.g., both users having low scores in "deployment readiness") may be excluded from each other's lists, while users with clear asymmetries in capabilities may be ranked higher. In one or more embodiments, the prioritization algorithm may also be dynamically updated based on feedback data or previous engagement results to ensure that high-value connections are continuously favored. In one or more embodiments, output of the rules engine 146 may be presented as a ranked connection queue, wherein each candidate user is annotated with explanatory metadata such as matched categories, implementation delta 154, and projected collaboration benefits. This output may be used by downstream modules such as an explainability module 156 or graphical user interface 166 layer to facilitate user understanding and interaction with recommended connections.

With continued reference to FIG. 1, at least a processor 104 may include an explainability module 156, wherein the explainability module 156 may be configured to: record one or more results 158 of a plurality of rules 160 applied by the rules engine 146; input the one or more results 158 into a large language model (LLM); and generate one or more natural language explanations 162. "Explainability module," as used in this disclosure, is a system component configured to generate interpretable outputs that clarify why a specific connection recommendation was generated. In one or more embodiments, an explainability module 156 may capture the logic paths, rule evaluations, and score comparisons that led to a particular ordering of connections. These intermediate results may include rule identifiers, evaluation metrics, score thresholds, match types (e.g., strength-to-weakness, domain-alignment), and contextual weighting factors applied by the rules engine 146. In one or more embodiments, an explainability module 156 may encode the results into structured prompts and submit them to a large language model trained to generate fluent, human-readable outputs. For example, and without limitation, the LLM may receive a prompt such as: "User A was recommended to connect with User B because User B has a high AI governance maturity score (0.92), while User A has a low score (0.38). Both users are in the financial services industry and have experience with natural language processing tools." Based on such input, the LLM may generate an explanation such as: "This connection is recommended to support your organization's AI governance development by pairing you with a peer who has demonstrated maturity in this area. Shared industry focus and common tool usage further increase the likelihood of successful collaboration." In one or more embodiments, an explainability module 156 may support multiple levels of explanation granularity. For example, and without limitation, a basic explanation may include only a primary reason for a recommendation (e.g., matched implementation delta), while an advanced explanation may provide a breakdown of multiple aligned factors, historical success rates of similar matches, or qualitative rationale derived from prior user feedback. In one or more embodiments, explanations may also be personalized by referencing user-submitted goals or previously expressed preferences, such as a focus on scaling AI deployment or interest in specific technologies.

With continued reference to FIG. 1, at least a processor 104 may generate, using an explanatory output 164 as a function of the at least one connection recommendation 140. "Explanatory output," as used in this disclosure, is a human-readable or machine-readable description generated by the system that conveys the rationale, criteria, or data-driven logic behind a connection recommendation. In one or more embodiments, explanatory output may include a summary of implementation score comparisons, rule triggers, delta calculations, and contextual attributes that contributed to the recommendation. In one or more embodiments, explanatory output may serve as a bridge between the algorithmic operation of the rules engine 146 and the user-facing justification of why a particular recommendation was made. In one or more embodiments, explanatory output may be generated by synthesizing results produced by rules engine 146 and explainability module 156. For example, and without limitation, explanatory output may describe that a first user 120 was matched with a second user 152 based on a significant maturity gap in deployment readiness, a shared use of specific AI platforms (e.g., Azure ML), and alignment in strategic priorities such as customer analytics. In one or more embodiments, explanatory output may be rendered as a plain-language narrative, such as: "You were recommended to connect with Alex Rivera from Company B because their organization demonstrates advanced deployment experience in AI solutions, an area your organization has identified as a development goal. Both entities use similar toolkits and operate within the healthcare industry, suggesting potential for relevant knowledge exchange." In one or more embodiments, explanatory output 164 may be synthesized by aggregating intermediate results generated by the rules engine 146 during evaluation of connection logic. These intermediate results may include, without limitation, an implementation delta values computed between a first user 120 and candidate users; identification of complementary strengths and weaknesses across maturity dimensions; flagging of matched categories such as shared AI tool usage or industry sector; and triggered rules with associated priority scores. For example and without limitation, if a rule specifies: "Recommend a connection when AI governance maturity difference exceeds 0.5 and industry classification is matched," and this rule is activated during the recommendation process, a rule identifier, score delta (e.g., 0.63), and matching attribute ("industry=financial services") may be recorded as part of a rule engine result set. In one or more embodiments, rule evaluation results may be passed to an explainability module 156, which may structure the rule activations, inputs, and justification metadata into a structured prompt format. A structured prompt may then be submitted to a large language model (LLM) to generate a natural-language explanation suitable for display to a user. For example and without limitation, a structured input may include: "Rule triggered; AI governance maturity delta=0.63; matched industry=financial services; both users use PyTorch and Azure ML; user A has low deployment readiness (0.41), user B has high (0.89)." As a result, LLM may then output an explanatory narrative such as: "This recommendation connects you with an organization that has demonstrated strong governance and deployment readiness in AI, areas where your organization has room for growth. Both organizations operate in financial services and use similar toolkits, making collaboration highly actionable." In one or more embodiments, explanatory output may be customized to varying levels of detail based on user preferences. For example and without limitation, a basic mode may display a summary statement citing the key rationale, while an advanced mode May expose the underlying rule IDs, implementation scores, and matching thresholds used during recommendation generation.

With continued reference to FIG. 1, at least one connection recommendation 140 may be configured to be displayed through a graphical user interface 166, wherein the graphical user interface 166 comprises a plurality of panels 168 and is configured to display the at least one connection recommendation 140 ranked according to the ordered list 148. A "graphical user interface 166 (GUI)," as used herein, is a graphical form of user interface that allows users to interact with electronic devices. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull down menu. When any option is clicked in this menu, then the pull down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface 166. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like.

With continued reference to FIG. 1, in one or more embodiments, a graphical user interface 166 may include a dedicated recommendations panel that displays the connection recommendations in descending order of priority, as determined by rules engine 146. In one or more embodiments, at least a recommendation may be represented as a card or list item containing key metadata, including name and organization of a second user 152, relevant implementation scores, shared attributes, and a summary of matched strengths. Visual indicators such as priority badges, maturity level icons, or color-coded deltas may be used to emphasize the relative ranking and rationale of each connection. In one or more embodiments, a panel within the graphical user interface 166 may be configured to support filtering and sorting of the recommended connections. For example, and without limitation, users may choose to filter recommendations by domain (e.g., healthcare, manufacturing), capability area (e.g., AI governance, NLP adoption), or geographic region. Sorting options may allow users to rank recommendations based on maturity delta, shared tool usage, recent activity, or feedback performance history. In one or more embodiments, at least a recommended connection displayed in the GUI may include an expandable section or pop-up modal that presents a corresponding explanatory output. For example, when a user clicks on a recommendation card, an overlay panel may appear displaying a natural language explanation generated by the explainability module 156. This explanation may summarize why the match was made, such as: "This connection is prioritized because User B's organization demonstrates advanced AI deployment experience, addressing a key gap in your maturity profile. Both of you operate in the same sector and use similar ML platforms, increasing the likelihood of successful collaboration." In some embodiments, the explanation may also highlight supporting evidence, such as specific implementation scores or recent project descriptions, formatted as bullet points or inline annotations. In one or more embodiments, additional panels in a graphical user interface 166 may display user profiles, AI capability assessments, or benchmarking reports side-by-side with the recommendation list, enabling users to compare and evaluate the fit of each recommendation in context. For example, a comparison panel may allow users to view their own implementation scores alongside those of the recommended connection, highlighting overlapping capabilities and mismatched areas. In one or more embodiments, interactive widgets may be used to provide real-time feedback on recommendations. For example, a user may use thumbs-up/down buttons, star ratings, or relevance sliders to indicate whether a given recommendation was useful. These widgets may trigger backend events for collecting feedback, which may later be incorporated into a learning module 176 to refine future recommendation logic.

With continued reference to FIG. 1, at least a processor 104 may include a feedback module 170, wherein the feedback module is configured to receive feedback 172 from the first user 120 as a function of a quality of at least one connection recommendation 174 and retrain the implementation criteria machine-learning model as a function of the feedback. "Feedback module," as used in this disclosure, is a system component configured to capture, interpret, and store user-generated signals that reflect perceived relevance, usefulness, or success of a recommended connection. "Feedback," as used in this disclosure, is a process of providing information about a system's output back to its input, allowing for adjustments and improvements. In one or more embodiments, feedback may be collected through interactive elements embedded in graphical user interface 166, such as rating controls, feedback text boxes, or binary relevance toggles. For example, and without limitation, a user may rate a connection recommendation as "highly relevant," "somewhat helpful," or "not useful," and optionally provide qualitative comments about a match's applicability to their current goals. In one or more embodiments, feedback may be categorized as explicit or implicit. Explicit feedback may include direct user inputs such as star ratings, thumbs-up/thumbs-down icons, dropdown selections, or written explanations. Implicit feedback may include behavioral indicators such as whether the user contacted the recommended peer, downloaded a shared resource, or ignored a recommendation without engagement. In either case, a feedback module 170 may convert this information into a structured signal that can be used to inform downstream learning models. In one or more embodiments, a feedback module 170 may assign confidence scores or weights to different types of feedback based on input modality or user engagement depth. For example, written feedback explaining why a recommendation was not relevant may be weighted more heavily than a single negative click. In one or more embodiments, feedback module 170 may also detect patterns across feedback submissions, such as repeated rejection of connections based on sector mismatch or insufficient maturity alignment, and generalize those trends to refine future outputs. In one or more embodiments, feedback received may be used to retrain an implementation criteria machine-learning model 142. "Retraining", as used in this context, refers to updating an implementation criteria machine-learning model 142 parameters or decision boundaries based on newly collected feedback data to improve classification accuracy and relevance of implementation scores. In one or more embodiments, retraining may occur on a scheduled basis or be triggered dynamically when a sufficient volume of feedback is received. For example, if several users with similar maturity profiles consistently downrank connections related to early-stage implementation partners, an implementation criteria machine-learning model 142 may learn to adjust the scoring of such matches downward for users in that cluster.

With continued reference to FIG. 1, at least a processor 104 may include a learning module 176, wherein the learning module 176 is configured to: receive feedback from the feedback module; and modify, by a reinforcement learning model 178, the rules engine 146 wherein the reinforcement learning model 178 is configure to update a rule logic 180 of the rules engine 146 as a function of the feedback and a quality of at least one connection recommendation 174. "Learning module," as used in this disclosure, is a system component that enables adaptive modification of rules engine 146 logic based on performance outcomes and user feedback. In one or more embodiments, a learning module 176 may continuously monitor an effectiveness of recommended connections by analyzing feedback signals, engagement data, and success indicators, and use these observations to guide the evolution of the system's decision-making process. "Reinforcement learning model," as used in this disclosure, is a framework wherein the system learns optimal decision policies through trial-and-error interactions with its environment, guided by feedback in the form of rewards or penalties. For example, and without limitation, an environment may include user responses to connection recommendations, and rewards are derived from quality metrics such as user satisfaction ratings, acceptance of a recommendation, or post-connection engagement levels. In one or more embodiments, a reinforcement learning model 178 may treat each connection recommendation as an action and observe its reward signal based on how a user responds. For example, and without limitation, if a user accepts a recommendation, initiates contact, and provides a high relevance rating, system may interpret this as a strong positive reward. If a recommendation is ignored or marked irrelevant, a reinforcement learning model 178 may assign a negative reward. Over time, learning module 176 may accumulate a history of such outcomes and use them to adjust how the rules engine 146 prioritizes future matches. In one or more embodiments, a reinforcement learning model 178 may modify rule logic 180 by adjusting weighting factors, rule thresholds, or scoring functions that drive the generation of an ordered list 148 of connection recommendations. For example, and without limitation, if data indicates that recommendations with large maturity deltas tend to underperform, a reinforcement learning model 178 may reduce a weight of delta-based matching and increase emphasis on other factors such as tool overlap or shared implementation context.

With continued reference to FIG. 1, in one or more embodiments, at least a processor 104 may implement one or more aspects of "generative artificial intelligence (AI)," a type of AI that uses machine learning algorithms to create, establish, or otherwise generate data such as, without limitation, structured user profiles, implementation readiness scores, recommendation explanations, synthetic user interaction logs, and predictive benchmarking output and/or the like in any data structure as described herein (e.g., text, image, video, audio, among others) that is similar to one or more provided training examples. In an embodiment, machine learning module described herein may generate one or more generative machine learning models that are trained on one or more set of user datasets comprising structured and unstructured user data, connection outcomes, and labeled feedback on recommendation quality. One or more generative machine learning models may be configured to generate new examples that are similar to the training data of the one or more generative machine learning models but are not exact replicas; for instance, and without limitation, data quality or attributes of the generated examples may bear a resemblance to the training data provided to one or more generative machine learning models, wherein the resemblance may pertain to underlying patterns, features, or structures found within the provided training data.

Still referring to FIG. 1, in some cases, generative machine learning models may include one or more generative models. As described herein, "generative models" refers to statistical models of the joint probability distribution P(X, Y) on a given observable variable x, representing features or data that can be directly measured or observed (e.g., user interaction history, textual capability assessments, benchmarking survey responses) and target variable y, representing the outcomes or labels that one or more generative models aims to predict or generate (e.g., recommendation relevance score, AI maturity classification, engagement likelihood). In some cases, generative models may rely on Bayes theorem to find joint probability; for instance, and without limitation, Naïve Bayes classifiers may be employed by at least a processor 104 to categorize input data such as, without limitation, unstructured narrative responses or organization profile attribute into different categories such as, without limitation, early-stage user, intermediate user, or advanced user.

In a non-limiting example, and still referring to FIG. 1, one or more generative machine learning models may include one or more Naïve Bayes classifiers generated, by at least a processor 104, using a Naïve bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)=P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. At least a processor 104 may then calculate a likelihood table by calculating probabilities of different data entries and classification labels. At least a processor 104 may utilize a naïve Bayes equation to calculate a posterior probability for each class. A class containing the highest posterior probability is the outcome of prediction.

Still referring to FIG. 1, although Naïve Bayes classifier may be primarily known as a probabilistic classification algorithm; however, it may also be considered a generative model described herein due to its capability of modeling the joint probability distribution P(X, Y) over observable variables X and target variable Y. In an embodiment, Naïve Bayes classifier may be configured to make an assumption that the features X are conditionally independent given class label Y, allowing generative model to estimate the joint distribution as P(X, Y)=P(Y)ΠiP(Xi|Y), wherein P(Y) may be the prior probability of the class, and $P(X_i|Y)$ is the conditional probability of each feature given the class. One or more generative machine learning models containing Naïve Bayes classifiers may be trained on labeled training data, estimating conditional probabilities $P(X_i|Y)$ and prior probabilities P(Y) for each class; for instance, and without limitation, using techniques such as Maximum Likelihood Estimation (MLE). One or more generative machine learning models containing Naïve Bayes classifiers may select a class label y according to prior distribution P(Y), and for each feature $X_i$, sample at least a value according to conditional distribution $P(X_i|y)$. Sampled feature values may then be combined to form one or more new data instance with selected class label y. In a non-limiting example, one or more generative machine learning models may include one or more Naïve Bayes classifiers to generate new examples of implementation readiness assessments based on user behavior classification (e.g., early-stage user, intermediate user, or advanced user), wherein the models may be trained using training data containing a plurality of features e.g., frequency of recommendation acceptance, number of AI tools referenced, assessment scores, and/or the like as input correlated to a plurality of labeled classes e.g., AI adoption stage classification as output.

Still referring to FIG. 1, in some cases, one or more generative machine learning models may include generative adversarial network (GAN). As used in this disclosure, a "generative adversarial network" is a type of artificial neural network with at least two sub models (e.g., neural networks), a generator, and a discriminator, that compete against each other in a process that ultimately results in the generator learning to generate new data samples, wherein the "generator" is a component of the GAN that learns to create hypothetical data by incorporating feedbacks from the "discriminator" configured to distinguish real data from the hypothetical data. In some cases, generator may learn to make discriminator classify its output as real. In an embodiment, discriminator may include a supervised machine learning model while generator may include an unsupervised machine learning model as described in further detail with reference to FIG. 2.

With continued reference to FIG. 1, in an embodiment, discriminator may include one or more discriminative models, i.e., models of conditional probability P(Y|X=x) of target variable Y, given observed variable X. In an embodiment, discriminative models may learn boundaries between classes or labels in given training data. In a non-limiting example, discriminator may include one or more classifiers as described in further detail below with reference to FIG. 2 to distinguish between different categories e.g., correct vs. incorrect, or states e.g., TRUE vs. FALSE within the context of generated data such as, without limitations, connection recommendation explanations, user classification labels, or feedback-driven match relevance indicators, and/or the like. In some cases, at least a processor 104 may implement one or more classification algorithms such as, without limitation, Support Vector Machines (SVM), Logistic Regression, Decision Trees, and/or the like to define decision boundaries.

In a non-limiting example, and still referring to FIG. 1, generator of GAN may be responsible for creating synthetic data that resembles real structured user profiles, recommendation outcomes, or connection engagement log. In some cases, GAN may be configured to receive textual benchmarking inputs, structured organizational metadata, or behavioral feedback vectors such as, without limitation, AI maturity assessment responses, frequency of system interaction, prior rating history, as input and generates corresponding predicted match outcomes containing information describing or evaluating the performance of one or more candidate users or opportunity matches. On the other hand, discriminator of GAN may evaluate the authenticity of the generated content by comparing it to real connection recommendation results, user engagement records, or validated benchmarking scores, for example, discriminator may distinguish between genuine and generated content and providing feedback to generator to improve the model performance.

With continued reference to FIG. 1, in other embodiments, one or more generative models may also include a variational autoencoder (VAE). As used in this disclosure, a "variational autoencoder" is an autoencoder (i.e., an artificial neural network architecture) whose encoding distribution is regularized during the model training process in order to ensure that its latent space includes desired properties allowing new data sample generation. In an embodiment, VAE may include a prior and noise distribution respectively, trained using expectation-maximization meta-algorithms such as, without limitation, probabilistic PCA, sparse coding, among others. In a non-limiting example, VEA may use a neural network as an amortized approach to jointly optimize across input data and output a plurality of parameters for corresponding variational distribution as it maps from a known input space to a low-dimensional latent space. Additionally, or alternatively, VAE may include a second neural network, for example, and without limitation, a decoder, wherein the "decoder" is configured to map from the latent space to the input space.

In a non-limiting example, and still referring to FIG. 1, VAE may be used by at least a processor 104 to model complex relationships between multimodal user data 112 sets e.g., structured benchmarking responses, AI capability assessments, interaction behavior logs, and unstructured feedback narratives. In some cases, VAE may encode input data into a latent space, capturing latent dimensions of AI maturity, capability alignment, or engagement intent. Such encoding process may include learning one or more probabilistic mappings from observed user profiling data and behavioral indicators to a lower-dimensional latent representation. Latent representation may then be decoded back into the original data space, therefore reconstructing the multimodal user data 112 sets. In some cases, such decoding process may allow VAE to generate new examples or variations that are consistent with the learned distributions.

Still referring to FIG. 1, at least a processor 104 may configure generative machine learning models to analyze input data such as, without limitation, structured user inputs, benchmarking scores, and unstructured narrative feedback to one or more predefined templates such as recommended connection archetypes or match outcome profiles representing correct connection recommendation results or classification labels described above, thereby allowing at least a processor 104 to identify discrepancies or deviations from expected recommendation logic or benchmarking alignment. In some cases, at least a processor 104 may be configured to pinpoint specific errors in AI maturity score inputs, connection engagement logs, narrative capability descriptions, or unstructured profile responses or any other aspects of the user input dataset. In a non-limiting example, at least a processor 104 may be configured to implement generative machine learning models to incorporate additional models to detect semantic inconsistencies, score anomalies, or mismatched classification labels. In some cases, errors may be classified into different categories or severity levels. In a non-limiting example, some errors may be considered minor, and generative machine learning model such as, without limitation, GAN may be configured to generate corrected benchmarking scores or refined connection recommendations containing only slight adjustments while others may be more significant and demand more substantial corrections. In some embodiments, at least a processor 104 may be configured to flag or highlight mismatches between recommended connections and user-defined goals, altering the user interface display to surface areas that need attention, directly on the structured recommendation output or feedback module using one or more generative machine learning models described herein. In some cases, one or more generative machine learning models may be configured to generate and output indicators such as, without limitation, visual indicator, audio indicator, and/or any other indicators as described above. Such indicators may be used to signal the detected error described herein.

Still referring to FIG. 1, in some cases, at least a processor 104 may be configured to identify and rank detected common deficiencies (e.g., frequent benchmarking inconsistencies, recommendation mismatches, or repeated feedback flags) across plurality of user datasets, feedback modules, and engagement logs; for instance, and without limitation, one or more machine learning models may classify errors in a specific order e.g., recommendation irrelevance or user disengagement in a descending order of commonality. Such ranking process may enable a prioritization of most prevalent issues, allowing instructors or at least a processor 104 to address the underlying alignment gaps, scoring misclassifications, or recurring mismatched criteria. In a non-limiting example, if 80% of users in a given industry segment consistently rate connections as not useful due to lack of domain alignment, that issue may be detected and targeted with corrected matching rules or template adjustments generated by one or more generative machine learning models.

Still referring to FIG. 1, in some cases, one or more generative machine learning models may also be applied by at least a processor 104 to edit, modify, or otherwise manipulate existing data or data structures. In an embodiment, output of training data used to train one or more generative machine learning models such as GAN as described herein may include historical recommendation cases, labeled user feedback, and prior implementation score distributions that linguistically or visually demonstrate modified connection recommendation outputs or AI maturity scores e.g., adjusted connection order, revised scoring logic, reweighted benchmarking dimensions, and/or the like. In some cases, revised ranked connection lists or adjusted explanatory narratives may be synchronized with original user input records, for example, and without limitation, in a side-by-side or even overlayed arrangement with the input user action data, providing real-time visual guidance. Additionally, or alternatively, interactive alerts or instructional prompts may be generated using generative machine learning models to highlight recommendation quality concerns or suggest corrective action plans for engagement gaps. In some cases, such explanatory visualizations or contextual connection diagnostics may be integrated with the user interface display, offering user a multisensory instructional experience.

Additionally, or alternatively, and still referring to FIG. 1, at least a processor 104 may be configured to continuously monitor incoming user assessments, real-time engagement behavior, and response to recommendations. In an embodiment, at least a processor 104 may configure discriminator to provide ongoing feedback and further corrections as needed to subsequent input data (e.g., new benchmarking submissions, updated capability statements, or live recommendation interactions). In some cases, one or more sensors such as, without limitation, wearable device, motion sensor, or other sensors or devices described herein may provide real-time usage telemetry or attention monitoring data that may be used as subsequent input data or training data for one or more generative machine learning models described herein. An iterative feedback loop may be created as at least a processor 104 continuously receive real-time data, identify errors as a function of real-time data, delivering corrections based on the identified errors, and monitoring user acceptance behavior, follow-through on recommendations, or updated qualitative feedback on the delivered corrections. In an embodiment, at least a processor 104 may be configured to retrain one or more generative machine learning models based on connection effectiveness metrics or observed user adaptation patterns or update training data of one or more generative machine learning models by integrating behavioral response logs and contextual scoring feedback into the original training data. In such embodiment, iterative feedback loop may allow machine learning module to adapt to the user's evolving context, accuracy expectations, and engagement style, enabling one or more generative machine learning models described herein to learn and update based on real-time system interactions and cumulative user response and generated feedback.

With continued reference to FIG. 1, other exemplary embodiments of generative machine learning models may include, without limitation, long short-term memory networks (LSTMs), (generative pre-trained) transformer (GPT) models, mixture density networks (MDN), and/or the like. As an ordinary person skilled in the art, upon reviewing the entirety of this disclosure, will be aware of various generative machine learning models may be used to generate synthetic benchmarking data, simulate user capability profiles, model natural language explanations of recommendation outcomes, or predict evolving engagement trends based on historical interactions.

Still referring to FIG. 1, in a further non-limiting embodiment, machine learning module may be further configured to generate a multi-model neural network that combines various neural network architectures described herein. In a non-limiting example, multi-model neural network may combine LSTM for time-series analysis with GPT models for natural language processing. Such fusion may be applied by at least a processor 104 to generate explanatory text narratives, dynamic AI maturity trajectory predictions, or personalized recommendation rationales. In some cases, multi-model neural network may also include a hierarchical multi-model neural network, wherein the hierarchical multi-model neural network may involve a plurality of layers of integration; for instance, and without limitation, different models may be combined at various stages of the network. Convolutional neural network (CNN) may be used for image feature extraction, followed by LSTMs for sequential pattern recognition, and a MDN at the end for probabilistic modeling. Other exemplary embodiments of multi-model neural network may include, without limitation, ensemble-based multi-model neural network, cross-modal fusion, adaptive multi-model network, among others. As an ordinary person skilled in the art, upon reviewing the entirety of this disclosure, will be aware of various generative machine learning models may be used to generate and refine user-specific outputs such as match scores, maturity classifications, or recommendation quality diagnostics described herein. As an ordinary person skilled in the art, upon reviewing the entirety of this disclosure, will be aware of various multi-model neural network and combination thereof that may be implemented by system 100 in consistent with this disclosure.

Figure 2:
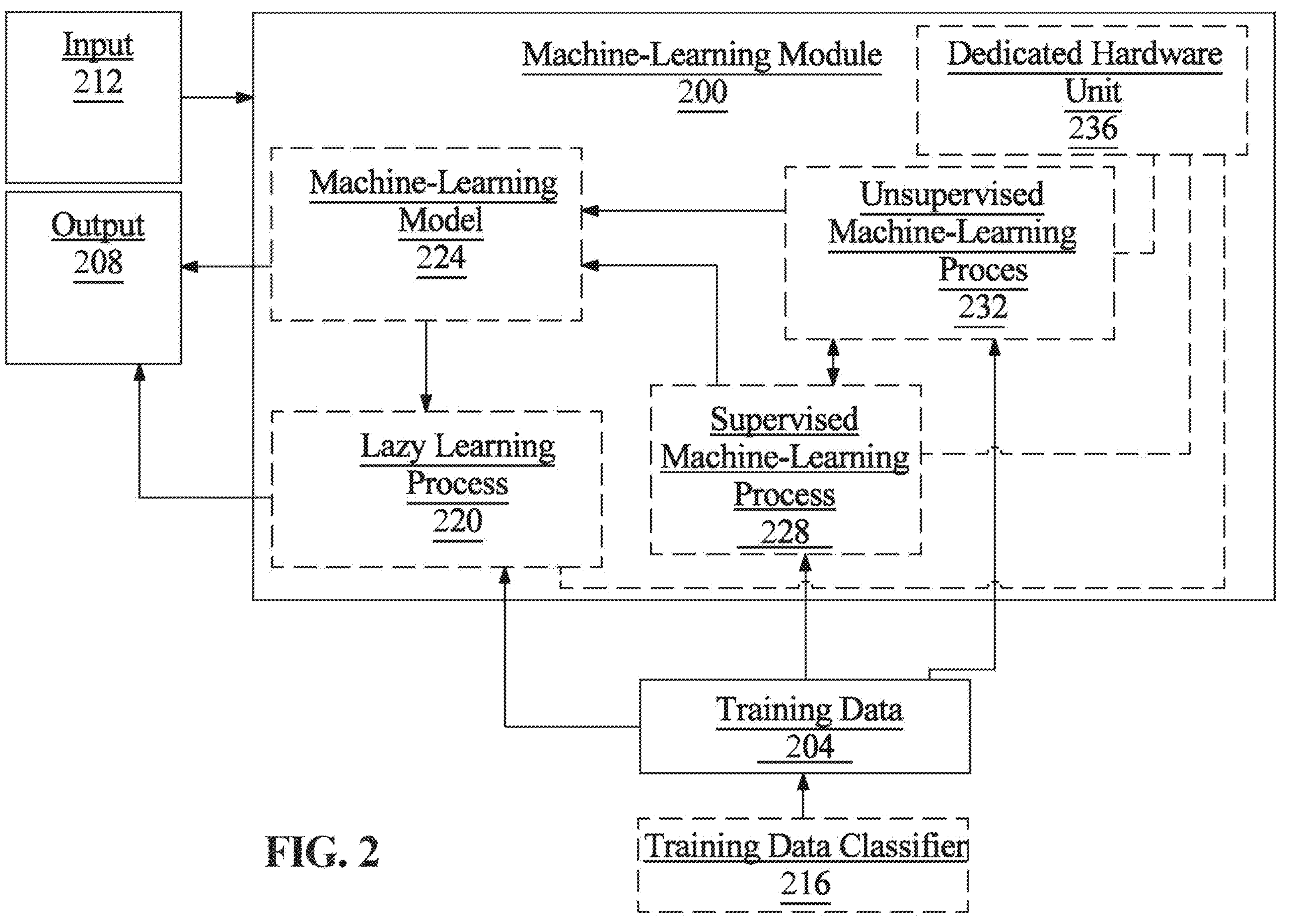
FIG. 2 is an exemplary embodiment of a machine-learning module.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to input data may include structured user metadata, unstructured narrative benchmarking responses, and interaction history logs, while output data may include AI maturity scores, capability classifications, and prioritized connection recommendations.

With continued reference to FIG. 2, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 2, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 2, training examples for use as training data may be selected from a population of potential examples according to cohorts relevant to an analytical problem to be solved, a classification task, or the like. Alternatively, or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively, or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 2, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively, or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively, or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 2, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 2, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max} : X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 2, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively, or additionally, one or more errors and/or error function values evaluated in training iterations may be compared to a threshold.

Continuing to refer to FIG. 2, evaluation of error function and/or other comparison results may include comparison of each of error function and/or other comparison results to a maximum single error threshold; in other words, a criterion of evaluation may include performing iterative retraining if any single comparison and/or error function output exceeds maximum single error threshold or if a count of single comparison and/or error function outputs exceeding single error threshold exceeds a threshold number and/or proportion of overall error function and/or other comparison results. Alternatively or additionally, evaluation of error function and/or other comparison results may include comparison of an aggregated plurality of error function and/or other comparison results to an aggregate error threshold; in other words, a criterion of evaluation may include performing iterative retraining if a result of averaging or otherwise aggregating a plurality such as some or all evaluated function and/or other comparison results exceeds aggregate error threshold. Aggregation may be performed in any manner of aggregation described in this disclosure and/or any combination thereof. Criteria for evaluations may be evaluated separately such that failing any one criterion causes iterative retraining; alternatively, or additionally evaluation results may be combined according to one or more logical or other rules.

As a non-limiting, illustrative example, and still referring to FIG. 2, where outputs to be compared by error function are numerical values, error function may include subtraction of one from the other to derive an absolute value and/or mean squared error. Where outputs and/or training examples are represented as a binary classification, an error function may include a hinge loss function, sigmoid cross entropy loss function, weighted cross entropy loss function, or the like. Where output and/or exemplary output in a training set is a classification to three or more values, error function may include a SoftMax cross entropy loss function, a sparse cross entropy loss function, a Kullback-Leibler divergence loss function, or the like. Where both retaining and training with include supervised training, retraining may use a different error function, different weight update functions and/or parameters, or the like than in the training stage. For instance, and without limitation, when a previous iterative retraining process included training using examples from until a first convergence threshold and/or epsilon value and/or neighborhood is met, a subsequent iterative retraining process may include a lower convergence threshold, a smaller value of epsilon, or the like. Iterative retraining may include using one or more examples that were not used in any previous training and/or retraining process; for instance, where convergence was initially and/or previously achieved using a first subset of examples a subsequent retraining process may use examples from a second subset of examples, which may be wholly disjoint from first subset and/or have one or more elements that are not found in first subset.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation, support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
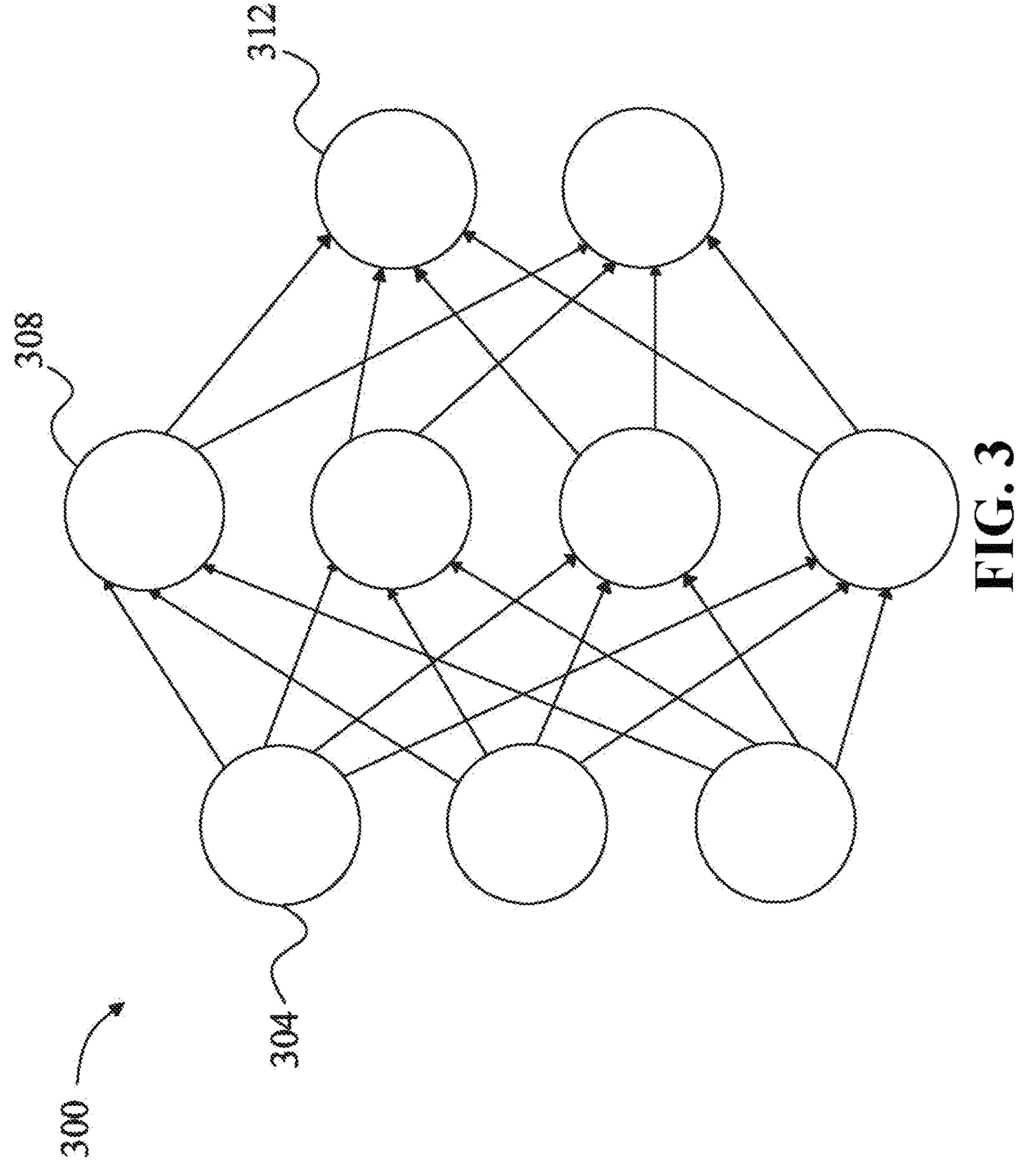
FIG. 3 is an exemplary embodiment of neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
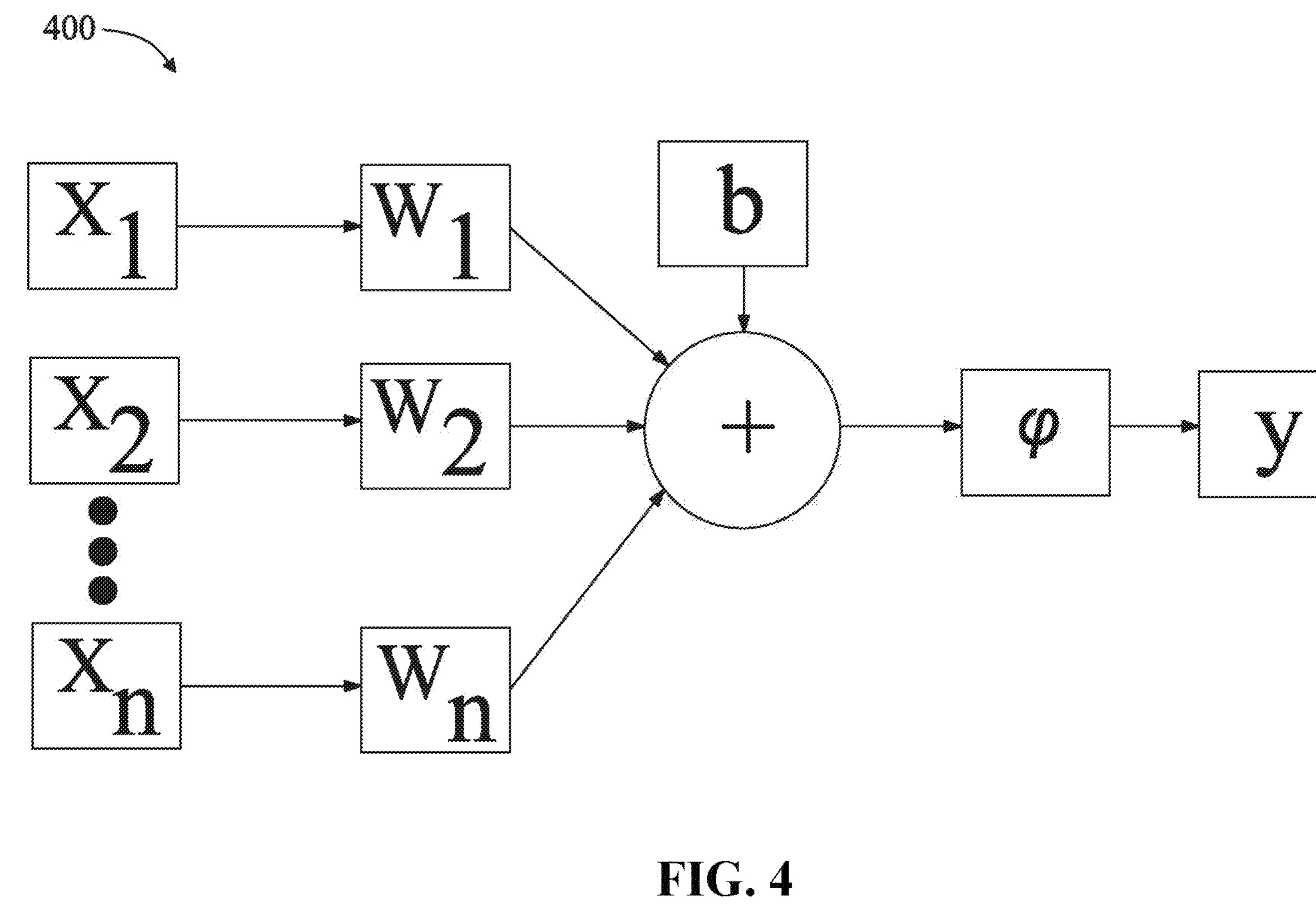
FIG. 4 is an exemplary embodiment of a node of a neural network.

Referring now to FIG. 4, an exemplary embodiment of a node 400 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $f(x)=1/1-e^{-x}$ given input x, a tanh (hyperbolic tangent) function, of the form $$\frac{e^x - e^{-x}}{e^x - e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha\frac{dJ}{dw}$$

where $w_{new}$ is the updated weight value, Wold is the previous weight value, α is a parameter to set the learning rate, and dJ/dw is the partial derivative of with respect to weight w.

Figure 5:
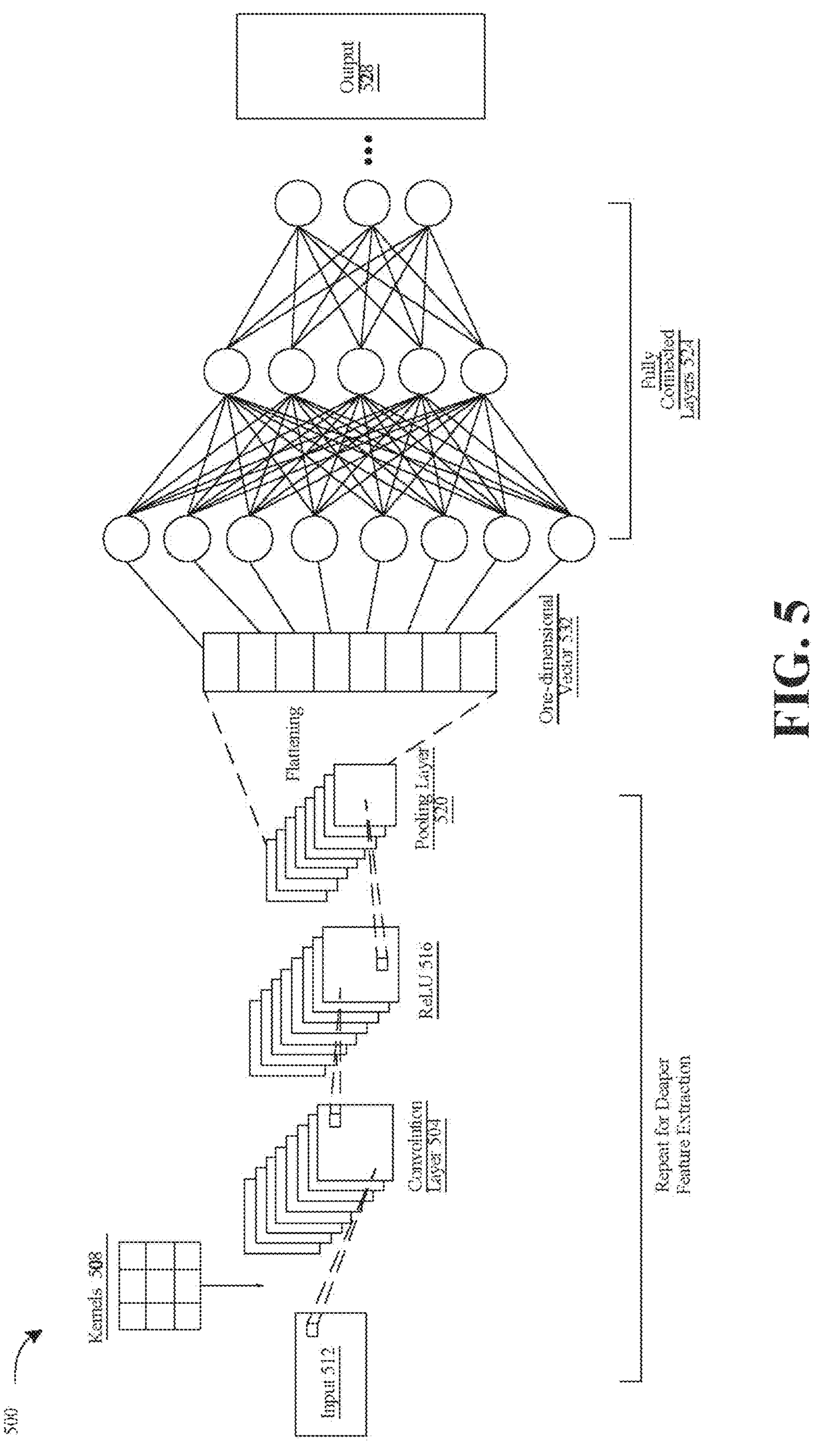
FIG. 5 is an exemplary embodiment of a convolutional neural network (CNN)

With continued reference to FIG. 5, in an embodiment, machine learning model may include a convolutional neural network (CNN) 500 designed to extract spatial hierarchies of features from input data through learned convolutional operations. For the purposes of this disclosure, a "convolutional neural network" is a neural network architecture characterized by the presence of one or more convolutional layers, where each convolutional layer performs localized operations to detect patterns within the input. A "kernel," for the purposes of this disclosure, is defined as a small matrix of learnable weights that slides across the input data, performing an element-wise multiplication and summation at each spatial location to generate a feature map. The convolution operation occurs explicitly within the convolutional layers 504, wherein each application of the kernel 508 detects specific localized features such as edges or simple textures by systematically scanning across the height and width of the input.

Still referring to FIG. 5, the convolutional layer 504 forms the first operation in a CNN 500, directly applying the kernel 508 over the input 512 through a sliding window mechanism. At each spatial location, the kernel 508 and the corresponding patch of input 512 are multiplied element-wise and summed, producing a single value within the resulting feature map. This process, repeated across the entire input 512, enables the CNN 500 to transform raw data into intermediate representations that highlight important local patterns. Following the convolution operation, the feature maps are passed through a non-linear activation function, such as a Rectified Linear Unit (ReLU) 516, to introduce non-linearity into the model, allowing for the learning of more complex and abstract features.

With continued reference to FIG. 5, additionally, or alternatively, CNN 500 may further include one or more pooling layers 520 configured to reduce the spatial dimensions of the generated feature maps while retaining the most salient information. For the purposes of this disclosure, a "pooling layer" is a layer that applies a fixed function to small regions of feature maps, summarizing the presence of features over localized areas. As a non-limiting example, the fixed function may include maximum selection or averaging. Pooling operations, such as max pooling, reduce the computational load for subsequent layers, improve generalization by promoting translation invariance, and help mitigate overfitting by condensing feature representations. In some embodiments, pooling layers 520 may be interleaved between multiple convolutional layers 504 to progressively abstract and distill the features extracted by the kernels 508 applied earlier in the network.

With continued reference to FIG. 5, in an embodiment, the sequence of convolutional and pooling layers 520 allows CNN 500 to learn increasingly complex feature hierarchies. Initial convolutional layers 504 may focus on simple patterns like edges and gradients, while deeper layers may combine these lower-level patterns into higher-level features representing meaningful parts of the input 512. Pooling layers 520, placed strategically throughout the network, ensure that the computational complexity remains manageable and that the learned representations are robust to small variations in the input 512. Thus, through the structured application of convolution and pooling operations, CNN 500 can achieve powerful feature extraction capabilities necessary for tasks such as image classification, object detection, and segmentation.

With continued reference to FIG. 5, in an embodiment, parameters associated with the convolution operation, such as stride and padding, may be utilized to control the spatial dimensions and structure of the resulting feature maps. For the purposes of this disclosure, a "stride" is defined as the number of pixels by which a kernel moves after each application of a convolution operation. In some embodiments, a stride of one may be used to ensure that the kernel 508 slides over the input 512 one pixel at a time, thereby producing a dense feature map. Increasing the stride value results in fewer applications of the kernel 508 across the input 512, which reduces the size of the feature map and can introduce a form of downsampling within the convolutional layer 504 itself. Additionally, or alternatively, "padding" may be applied to the input 512, wherein additional pixels, typically initialized to zero, are added around the boundary of the input 512. Padding may be used to preserve the spatial dimensions of the input 512 following the convolution operation, thereby ensuring that the feature maps retain sufficient resolution for deeper network layers. Through adjustment of stride and padding parameters, CNNs 504 may flexibly manage the resolution, computational cost, and abstraction of spatial features extracted from input 512.

With continued reference to FIG. 5, in an embodiment, CNN 500 may include a sequence of multiple convolutional and pooling layers 520 arranged in a hierarchical manner to enable progressively deeper feature extraction. In early layers, convolutional operations may detect simple spatial patterns such as edges and textures, while in deeper layers, the network may combine these lower-level patterns into more abstract representations, such as object parts or complex textures. Each successive convolutional layer 504 operates on the feature maps generated by the preceding layer, allowing the network to learn increasingly rich and complex feature hierarchies across multiple levels of abstraction. Pooling layers 520, interspersed between convolutional layers 504, serve to reduce the spatial dimensions of the feature maps, making it computationally feasible to construct deep architectures without an excessive increase in parameters or resource requirements. As a result, the depth of a CNN 500, enabled through the stacking of convolutional and pooling layers 520, provides the capacity to model intricate data relationships and perform high-level tasks such as image classification, object recognition, and segmentation with high accuracy and generalization capability.

With continued reference to FIG. 5, in an embodiment, after passing through multiple convolutional and pooling layers 520, the extracted features may be further processed by one or more fully connected layers 524 configured to perform high-level reasoning and generate final outputs 528 corresponding to specific tasks such as classification, detection, or regression. For the purposes of this disclosure, a "fully connected layer" is defined as a layer in which each neuron is connected to every neuron in the preceding layer, thereby enabling the combination of spatially distributed features into a comprehensive representation. In some embodiments, the feature maps output by the final pooling or convolutional layer 504 may be flattened into a one-dimensional vector 532 prior to being input into the fully connected layers 524. Fully connected layers 524 enable the CNN 500 to synthesize the learned spatial features into a global interpretation of the input 512, facilitating complex decision-making processes. Additionally, or alternatively, activation functions such as Rectified Linear Unit (ReLU) 516 may be applied within fully connected layers 524 to introduce non-linearity, and regularization techniques such as dropout may be employed to prevent overfitting by randomly disabling a subset of neurons during training.

Figure 6:
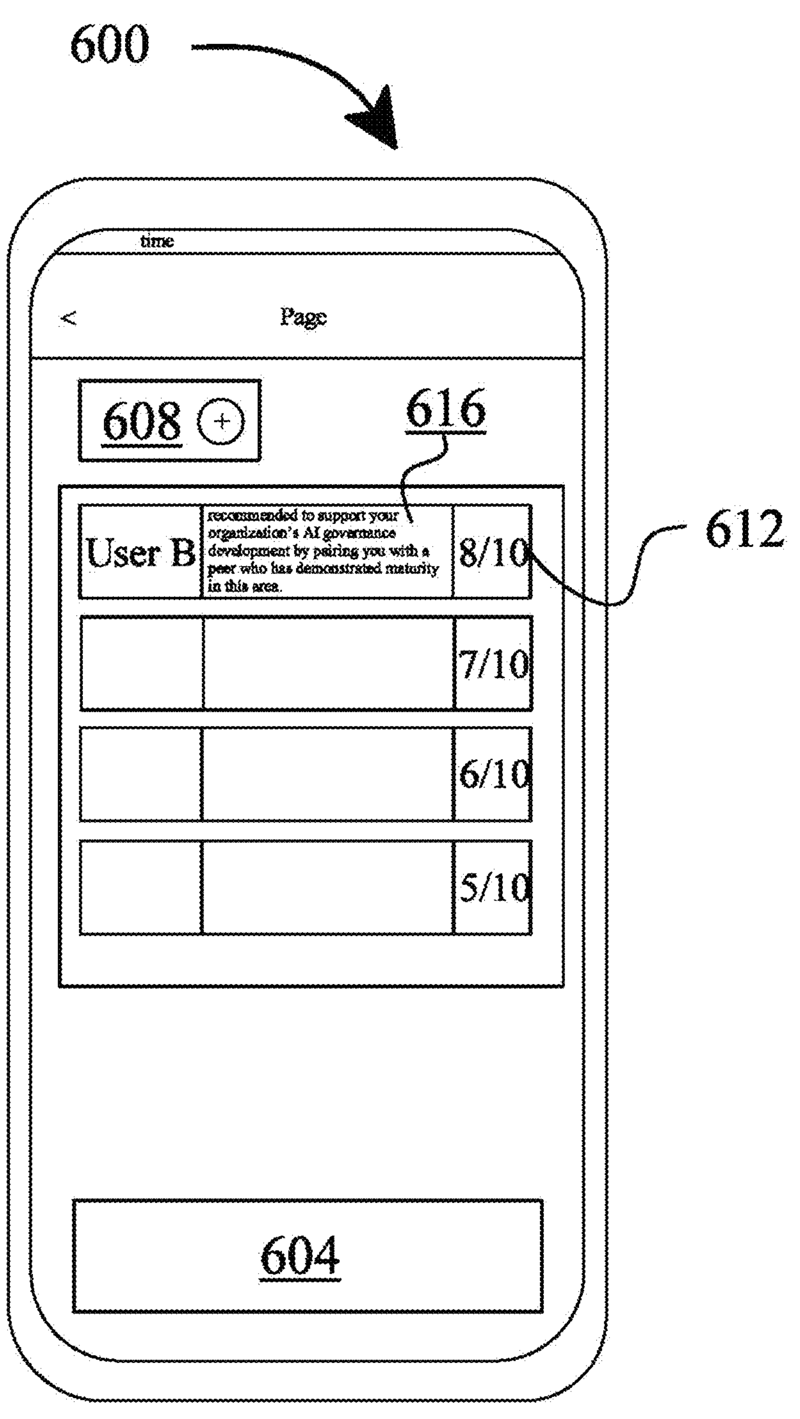
FIG. 6 is an exemplary embodiment of a graphical user interface for system.
Figure 7:
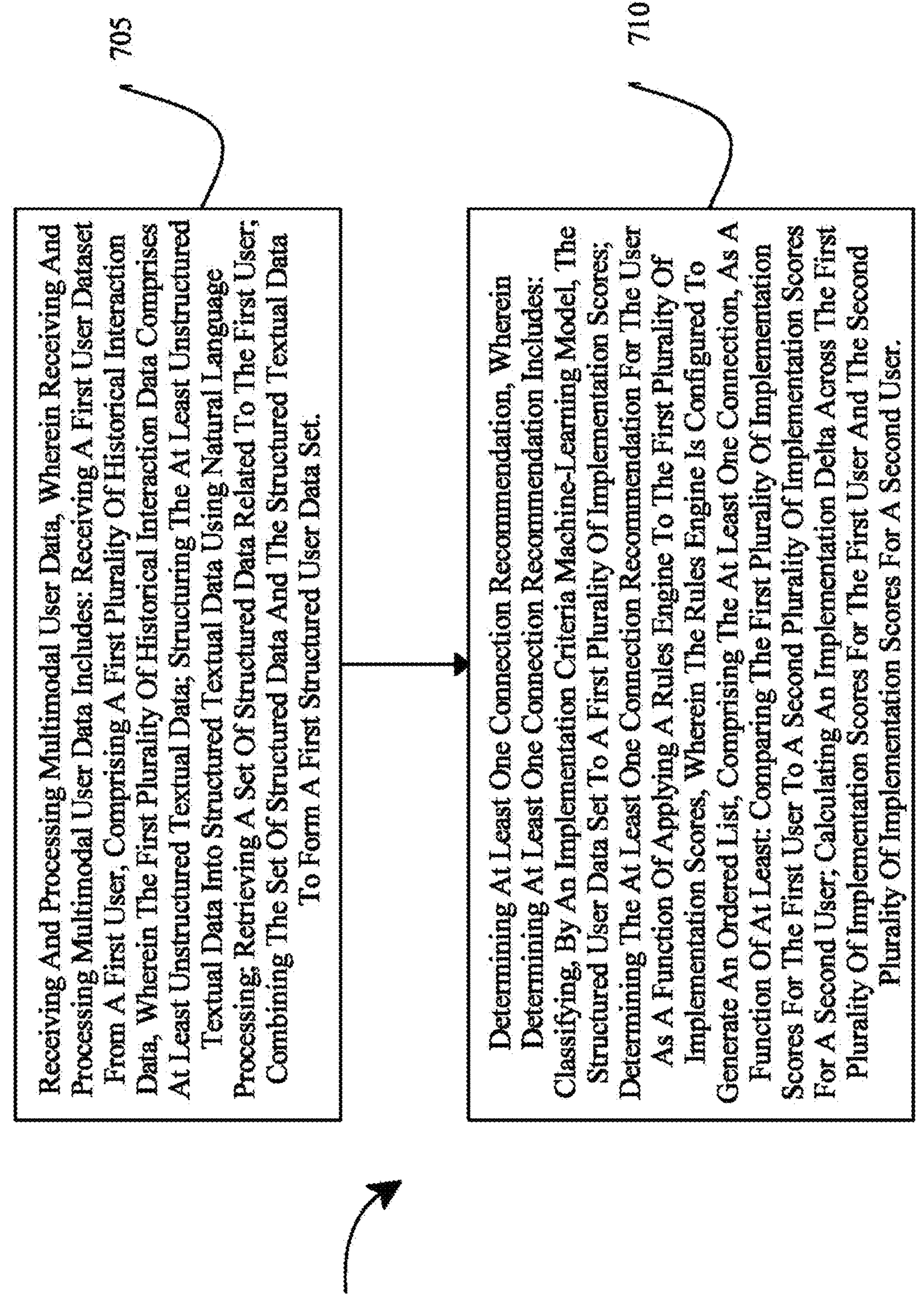
FIG. 7 is a flow diagram of exemplary method for a system for content classification and recommendation.

Referring now to FIG. 6, an exemplary embodiment of a graphical user interface for system 100 is illustrated. Graphical user interface (GUI) 600 may be implemented as described with continued reference to FIG. 1. In one embodiment, a text box 604 may be configured to receive natural language input from a user. A text box 604 may allow a user to enter free-form questions or prompts related to the system's outputs. In some embodiments, a text input may be processed by a large language model (LLM), enabling the user to ask questions about the rationale behind one or more recommendations, request clarifications, or obtain additional context regarding diagnostic or connection outputs. In one embodiment, an upload button 608 may be configured to receive one or more user-submitted files. Uploaded files may be in various formats, including but not limited to PDF, CSV, DOCX, TXT, XML, or JSON, and may contain information related to a user's profile, historical activity, investment records, or any other data relevant to generating or refining a system's recommendations. In some embodiments, uploaded data may be automatically parsed and integrated into the analysis pipeline to enhance recommendation accuracy or update the user's representation within system. In one or more embodiments, one or more connection recommendations 612 may be displayed through GUI 600. Each connection recommendation 612 may correspond to a suggested user or resource, ranked according to a calculated match score that reflects the strength or relevance of the connection based on shared characteristics, complementary attributes, or aligned goals. In some embodiments, a descriptive explanation 616 may be displayed in association with each connection recommendation 612. Description 616 may provide the user with interpretable reasoning for the recommendation, including the specific attributes, alignment scores, or contextual factors that contributed to the match. Referring now to FIG. 7, a flow diagram of an exemplary method 700 for dataset classification and recommendation is illustrated. At step 705, method 700 includes receiving and processing multimodal user data, wherein receiving and processing multimodal user data includes: receiving a first user dataset from a first user, comprising a first plurality of historical interaction data, wherein the first plurality of historical interaction data comprises at least unstructured textual data; structuring the at least unstructured textual data into structured textual data using natural language processing; retrieving a set of structured data related to the first user. combining the set of structured data and the structured textual data to form a first structured user data set. This may be implemented as described and with reference to FIGS. 1-6.

With continued reference to FIG. 7, at step 710, method 700 includes determining at least one connection recommendation, wherein determining at least one connection recommendation includes: classifying, by an implementation criteria machine-learning model, the structured user data set to a first plurality of implementation scores; determining the at least one connection recommendation for the user as a function of applying a rules engine to the first plurality of implementation scores, wherein the rules engine is configured to generate an ordered list, comprising the at least one connection, as a function of at least: comparing the first plurality of implementation scores for the first user to a second plurality of implementation scores for a second user. calculating an implementation delta across the first plurality of implementation scores for the first user and the second plurality of implementation scores for a second user. This may be implemented as described and with reference to FIGS. 1-6.

It is to be noted that any one or more of the aspects and embodiments described herein may be conveniently implemented using one or more machines (e.g., at least a processor 104 that are utilized as a user at least a processor 104 for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., at least a processor 104) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., at least a processor 104) and any related information (e.g., data structures and data) that causes the machine to perform any one of the methodologies and/or embodiments described herein.

Examples of at least a processor 104 include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, at least a processor 104 may include and/or be included in a kiosk.

Figure 8:
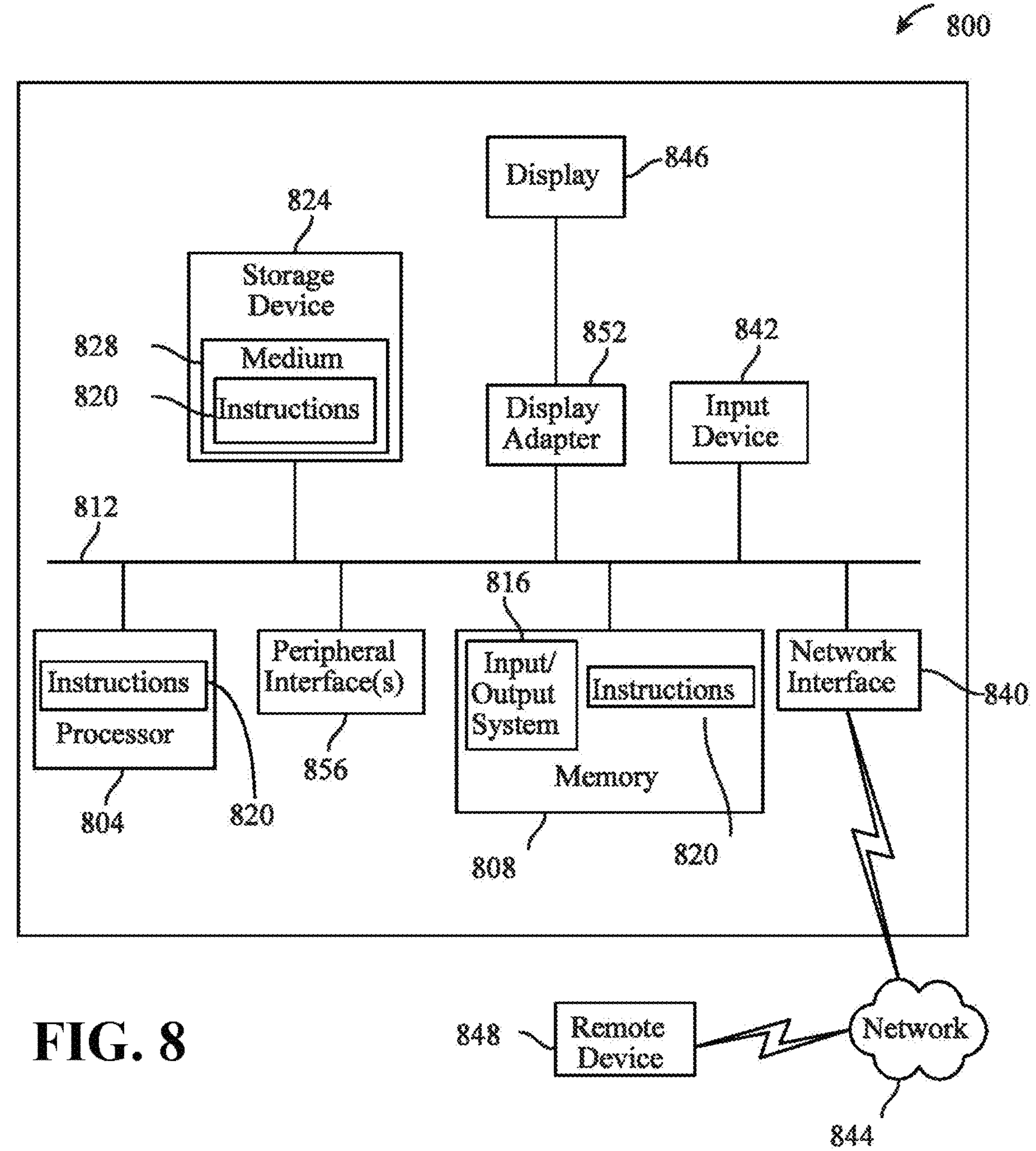
FIG. 8 is a block diagram of a computing system that can be used to implement any one or more of the methodologies disclosed herein and any one or more portions thereof.

FIG. 8 shows a diagrammatic representation of one embodiment of at least a processor 104 in the exemplary form of a computer system 800 within which a set of instructions for causing a control system to perform any one or more of the aspects and/or methodologies of the present disclosure may be executed. It is also contemplated that multiple at least a processor 104 may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulo's algorithm. As used in this disclosure, "a processor," and/or "configuring a processor," is equivalent for the purposes of this disclosure to at least a processor 104, a plurality of processors, and/or a plurality of processor cores, and/or programming at least a processor 104, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof. Memory 808 may include a primary memory and a secondary memory. "Primary memory," which may be implemented, without limitation as "random access memory" (RAM), is memory used for temporarily storing data for active use by a processor. In one or more embodiments, during use of the at least a processor 104, instructions and/or information may be transmitted to primary memory wherein information may be processed. In one or more embodiments, information may only be populated within primary memory while a particular software is running. In one or more embodiments, information within primary memory is wiped and/or removed after the at least a processor 104 has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In some embodiments, storage device 824 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two at least a processor 104, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display 836. Examples of a display device include, but are not limited to, a liquid crystal display (LCD), a cathode ray tube (CRT), a plasma display, a light emitting diode (LED) display, and any combinations thereof. Display adapter 852 and display 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

Further referring to FIG. 8, at least a processor 104 may include any at least a processor 104 as described in this disclosure, including without limitation a microcontroller, microprocessor, digital signal processor (DSP) and/or system on a chip (SoC) as described in this disclosure. At least a processor 104 may include, be included in, and/or communicate with a mobile device such as a mobile telephone or smartphone. At least a processor 104 may include a single device having components as described above operating independently, or may include two or more such devices and/or components thereof operating in concert, in parallel, sequentially or the like; two or more devices, processors, memory elements, and the like may be included together in a single at least a processor 104 or in two or more at least a processor 104. At least a processor 104 may interface or communicate with one or more additional devices as described below in further detail via a network interface device.

In some embodiments, and still referring to FIG. 8, at least a processor 104 may be a component of a combination of at least a processor 104; at least a processor 104 may include, as a non-limiting example, a first at least a processor 104 or cluster of at least a processor 104 in a first location and a second at least a processor 104 or cluster of at least a processor 104 in a second location. At least a processor 104 may include one or more at least a processor 104 dedicated to data storage, security, distribution of traffic for load balancing, and the like. At least a processor 104 may distribute one or more computing tasks as described below across a plurality of at least a processor 104 of at least a processor 104, which may operate in parallel, in series, redundantly, or in any other manner used for distribution of tasks or memory between at least a processor 104. At least a processor 104 may be implemented, as a non-limiting example, using a "shared nothing" architecture.

With continued reference to FIG. 8, one or more programs or software instructions may include a principal program and/or operating system; principal program and/or operating system may be a program that runs automatically upon startup of at least a processor 104 and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple at least a processor 104, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 800, processor 804, and memory 808 may be virtualized; that is, a virtual machine and/or container may interact directly with such computing system 800, processor 804, and/or memory 808, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 804 comprises a plurality of processors and/or processor cores, virtualization may, in some cases, simulate or emulate a single (virtual) processor whose functions are allocated to one or more of the plurality of processors and/or processor cores. In this case, while processor 804 may be said to be virtualized, the processor 804, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU, www.qemu.org; (2) VMware by Broadcom Inc of Palo Alto, California; (3) VirtualBox by Oracle Corporation headquartered in Austin, Texas; and (4) kernel-based virtual machine (KVM) www.linux-kvm.org.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for dataset classification and recommendation, wherein the system comprises:
- at least a processor; and
- a memory, wherein the memory contains instructions configuring the at least a processor to:
  - receive and process multimodal user data, wherein receiving and processing multimodal user data comprises:
    - receiving a first user dataset from a first user, comprising a first plurality of historical interaction data, wherein the first plurality of historical interaction data comprises at least unstructured textual data;
    - structuring the at least unstructured textual data into structured textual data using natural language processing;
    - retrieving a set of structured data related to the first user; and
    - combining the set of structured data and the structured textual data to form a first structured user data set;
  - determine at least one connection recommendation, wherein determining at least one connection recommendation comprises:
    - classifying, by an implementation criteria machine-learning model, the first structured user data set to a first plurality of implementation scores;
    - retrieving a second plurality of implementation scores for a second user;
    - calculating an implementation delta across the first plurality of implementation scores for the first user and the second plurality of implementation scores for the second user; and
    - determining the at least one connection recommendation for the first user by applying a rules engine to the implementation delta, wherein the rules engine is configured to:
      - identify, as a function of the implementation delta, at least one relative implementation weakness of the first user;
      - identify, for the second user, a corresponding implementation strength associated with the relative implementation weakness; and
      - generate an ordered list, comprising the at least one connection recommendation, as a function of prioritizing the second user as a function of the corresponding implementation strength selected to address the relative implementation weakness; and
  - display, through a graphical user interface, the at least one connection recommendation, wherein the graphical user interface:
    - comprises a plurality of panels; and
    - is configured to display the at least one connection recommendation ranked according to the ordered list.

2. The system of claim 1, wherein structuring the at least unstructured textual data into structured textual data using natural language processing comprises applying a natural language processing module, wherein the natural language processing module comprises name entity recognition tool.

3. The system of claim 2, wherein the name entity recognition tool is configured to identify one or more artificial intelligence tools and one or more tasks in at least unstructured textual data.

4. The system of claim 1, further comprising a feedback module, wherein the feedback module is configured to:

receive feedback from the first user as a function of a quality of at least one connection recommendation; and retrain the implementation criteria machine-learning model as a function of the feedback.

5. The system of claim 1, further comprising a learning module, wherein the learning module is configured to:

receive feedback from the feedback module; and modify, by a reinforcement learning model, the rules engine wherein the reinforcement learning model is configure to update a rule logic of the rules engine as a function of the feedback and a quality of at least one connection recommendation.

6. The system of claim 1, wherein the memory contains instructions further configuring the at least a processor to generate, using an explanatory output as a function of the at least one connection recommendation.

7. The system of claim 1, further comprising an explainability module, wherein the explainability module is configured to:

record one or more results of a plurality of rules applied by the rules engine;

input the one or more results into a large language model (LLM); and generate one or more natural language explanations as a function of the one or more results, using the LLM.

8. The system of claim 1, wherein the rules engine is further configured to:

determine an implementation delta for each of a plurality of implementation score categories as a function of a strength in an area corresponding to a relative weakness in the first plurality of implementation scores for the first user;

identify a second user from a set of candidate users as a function of the second plurality of the implementation delta; and prioritize the ordered list of the at least one connection recommendation as a function of an aggregation of determined implementation deltas across the plurality of implementation score categories.

9. The system of claim 1, wherein retrieving a set of structured data related to the first user comprises using a web crawler to collect public data associated with the first user.

10. A method for dataset classification and recommendation, the method comprises:

receiving and processing, using at least a processor, multimodal user data, wherein receiving and processing multimodal user data comprises:

receiving a first user dataset from a first user, comprising a first plurality of historical interaction data, wherein the first plurality of historical interaction data comprises at least unstructured textual data;

structuring the at least unstructured textual data into structured textual data using natural language processing;

retrieving a set of structured data related to the first user; and combining the set of structured data and the structured textual data to form a first structured user data set; and determining, using the at least a processor, at least one connection recommendation, wherein determining at least one connection recommendation comprises:

classifying, by an implementation criteria machine-learning model, the first structured user data set to a first plurality of implementation scores;

retrieving a second plurality of implementation scores for a second user;

calculating an implementation delta across the first plurality of implementation scores for the first user and the second plurality of implementation scores for the second user; and determining the at least one connection recommendation for the first user by applying a rules engine to the implementation delta, wherein the rules engine is configured to:

identify, as a function of the implementation delta, at least one relative implementation weakness of the first user;

identify, for the second user, a corresponding implementation strength associated with the relative implementation weakness; and generate an ordered list, comprising the at least one connection recommendation, as a function of: prioritizing the second user as a function of the corresponding implementation strength selected to address the relative implementation weakness; and displaying, using the at least a processor and a graphical user interface, the at least one connection recommendation, wherein the graphical user interface:

comprises a plurality of panels; and is configured to display the at least one connection recommendation ranked according to the ordered list.

11. The method of claim 10, wherein structuring the at least unstructured textual data into structured textual data using natural language processing comprises applying a natural language processing module, wherein the natural language processing module comprises name entity recognition tool.

12. The method of claim 11, wherein the name entity recognition tool is configured to identify one or more artificial intelligence tools and one or more tasks in at least unstructured textual data.

13. The method of claim 10, further comprising receiving, by a feedback module, feedback from the first user as a function of a quality of at least one connection recommendation.

14. The method of claim 10, further comprising:

receiving, by a learning module, feedback from the feedback module;

modifying, by a reinforcement learning model, the rules engine wherein the reinforcement learning model is configured to update a rule logic of the rules engine as a function of the feedback and a quality of at least one connection recommendation.

15. The method of claim 10, further comprising generating, using an explanatory output as a function of the at least one connection recommendation.

16. The method of claim 10, further comprising:

recording, by explainability module, one or more results of a plurality of rules applied by the rules engine;

inputting the one or more results into a large language model (LLM); and generating one or more natural language explanations as a function of the one or more results, using the LLM.

17. The method of claim 10, wherein the rules engine is further configured to:

determine an implementation delta for each of a plurality of implementation score categories as a function of a strength in an area corresponding to a relative weakness in the first plurality of implementation scores for the first user;

identify a second user from a set of candidate users as a function of the second plurality of the implementation delta; and prioritize the ordered list of the at least one connection recommendation as a function of an aggregation of determined implementation deltas across the plurality of implementation score categories.

18. The method of claim 10, wherein retrieving a set of structured data related to the first user comprises using a web crawler to collect public data associated with the first user.

* * * * *